US 11,050,590 B2

(12) United States Patent
Kilian et al.

(10) Patent No.: US 11,050,590 B2
(45) Date of Patent: Jun. 29, 2021

(54) DECODER-SUPPORTED ITERATIVE CHANNEL ESTIMATION

(71) Applicants: Fraunhofer-Gesellschaft zur Foerderung der angewandten Forschung e.V., Munich (DE); Friedrich-Alexander-Universitaet Erlangen-Nuernberg, Erlangen (DE)

(72) Inventors: Gerd Kilian, Erlangen (DE); Jakob Kneissl, Erlangen (DE); Frank Obernosterer, Nuremberg (DE); Raimund Meyer, Fuerth (DE); Eberhard Gamm, Ebermannstadt (DE); Joerg Robert, Uttenreuth (DE); Johannes Wechsler, Erlangen (DE); Josef Bernhard, Erlangen (DE); Michael Schlicht, Erlangen (DE)

(73) Assignees: Fraunhofer-Gesellschaft zur Foerderung der angewandten Forschung e.V., Munich (DE); Friedrich-Alexander-Universitaet Erlangen-Nuernberg, Erlangen (DE)

(*) Notice: Subject to any disclaimer, the term of this patent is extended or adjusted under 35 U.S.C. 154(b) by 0 days.

(21) Appl. No.: 17/072,974

(22) Filed: Oct. 16, 2020

(65) Prior Publication Data
US 2021/0083906 A1 Mar. 18, 2021

Related U.S. Application Data

(63) Continuation of application No. PCT/EP2019/060006, filed on Apr. 17, 2019.

(30) Foreign Application Priority Data
Apr. 20, 2018 (DE) .......................... 102018206132.7

(51) Int. Cl.
H04L 25/02 (2006.01)
(52) U.S. Cl.
CPC .............................. *H04L 25/0236* (2013.01)
(58) Field of Classification Search
None
See application file for complete search history.

(56) References Cited

U.S. PATENT DOCUMENTS 7,486,726 B2 * 2/2009 Alexander .......... H04L 25/0204
375/232
7,760,814 B2 * 7/2010 Jungnickel .......... H04B 7/0413
375/267

(Continued)

FOREIGN PATENT DOCUMENTS

CA 2269925 A1 * 10/1999 ......... H04L 25/0202
CA 2306027 A1 * 10/2000 ......... H04L 25/0236

(Continued)

OTHER PUBLICATIONS

Kuor-Hsin Chang and C. N. Georghiades, "Iterative joint sequence and channel estimation for fast time-varying intersymbol interference channels," Proceedings IEEE International Conference on Communications ICC '95, 1995, pp. 357-361 vol. 1, doi: 10.1109/ICC.1995.525193 (Year: 1995).*

(Continued)

*Primary Examiner* — Berhanu Tadese
(74) *Attorney, Agent, or Firm* — Perkins Coie LLP; Michael A. Glenn

(57) ABSTRACT

A data receiver configured to receive a signal having at least two partial data packets, the data receiver being configured to estimate a state of a transmission channel, to obtain first channel state information, to demodulate a first set of received symbols from different data packets, to obtain a first set of received encoded bits, wherein the data receiver is configured to decode the first set of received encoded bits (Continued)

to determine, a first set of estimated encoded bits which corresponds more likely to a first set of transmitted encoded bits than the received encoded bits, and to map the first set of estimated bits to estimated transmission symbols using a mapping rule matching a transmitter-side mapping rule to obtain a first set of estimated transmission symbols, and to determine second channel state information using the first set of estimated transmission symbols.

24 Claims, 14 Drawing Sheets

(56) References Cited

U.S. PATENT DOCUMENTS

| | | | | |
|---|---|---|---|---|
| 8,411,767 | B2 * | 4/2013 | Alexander | H04L 25/03171 375/260 |
| 8,792,594 | B2 * | 7/2014 | Vojcic | H03M 13/27 375/340 |
| 9,191,256 | B2 * | 11/2015 | Vojcic | G06F 11/1625 |
| 9,354,081 | B2 | 5/2016 | Bernhard et al. | |
| 9,391,643 | B2 * | 7/2016 | Vojcic | H03M 13/6552 |
| 9,455,861 | B2 * | 9/2016 | Vojcic | H04L 1/004 |
| 9,461,863 | B2 * | 10/2016 | Vojcic | H03M 13/27 |
| 9,698,941 | B2 * | 7/2017 | Vojcic | H03M 13/1515 |
| 2002/0150037 | A1 * | 10/2002 | Bao | H04L 27/2647 370/208 |
| 2003/0189992 | A1 * | 10/2003 | Nefedov | H04L 25/0236 375/340 |
| 2004/0264561 | A1 * | 12/2004 | Alexander | H04L 25/0204 375/232 |
| 2008/0317150 | A1 * | 12/2008 | Alexander | H04L 27/2662 375/260 |
| 2009/0103666 | A1 | 4/2009 | Zhao et al. | |
| 2009/0168910 | A1 * | 7/2009 | Futatsugi | H04L 25/03286 375/260 |
| 2011/0202280 | A1 * | 8/2011 | Sikora | G16B 25/00 702/19 |
| 2012/0263464 | A1 * | 10/2012 | Koike-Akino | H04L 25/024 398/65 |
| 2014/0153625 | A1 * | 6/2014 | Vojcic | G06F 11/1625 375/224 |
| 2014/0153628 | A1 * | 6/2014 | Vojcic | H03M 13/3746 375/227 |
| 2014/0376650 | A1 * | 12/2014 | Vojcic | H03M 13/1108 375/260 |
| 2015/0043926 | A1 * | 2/2015 | Levy | H04L 1/0054 398/202 |
| 2015/0215010 | A1 * | 7/2015 | Shim | H04B 7/0413 375/341 |
| 2016/0043743 | A1 * | 2/2016 | Vojcic | H03M 13/6541 714/755 |
| 2016/0043744 | A1 * | 2/2016 | Vojcic | H03M 13/658 714/755 |
| 2016/0043745 | A1 * | 2/2016 | Vojcic | H03M 13/1131 714/755 |
| 2016/0072657 | A1 * | 3/2016 | Vojcic | H03M 13/6325 375/260 |
| 2016/0352463 | A1 * | 12/2016 | Vojcic | H03M 13/453 |
| 2019/0288741 | A1 | 9/2019 | Kilian et al. | |
| 2021/0083906 | A1 * | 3/2021 | Kilian | H04L 25/0236 |

FOREIGN PATENT DOCUMENTS

| | | | | |
|---|---|---|---|---|
| CA | 2627057 | A1 * | 9/2008 | H04L 25/022 |
| CA | 3097639 | A1 * | 10/2019 | H04L 25/0236 |
| CN | 105122655 | A * | 12/2015 | H03M 13/373 |
| CN | 105144598 | A * | 12/2015 | H04B 17/309 |
| DE | 102011082098 | A1 | 3/2013 | |
| DE | 102018206132 | A1 * | 10/2019 | H04L 25/0236 |
| EP | 0952682 | A2 * | 10/1999 | H04L 25/0204 |
| EP | 0954143 | A1 | 11/1999 | |
| EP | 0954143 | A1 * | 11/1999 | H04L 25/0212 |
| EP | 1416688 | A1 * | 5/2004 | H04L 25/0236 |
| EP | 1569399 | A1 * | 8/2005 | H04L 25/03305 |
| EP | 1608118 | A1 * | 12/2005 | H04L 25/0232 |
| EP | 1830529 | A1 * | 9/2007 | H04L 25/0236 |
| EP | 2144413 | A1 * | 1/2010 | H04L 1/005 |
| EP | 2144413 | B1 * | 10/2014 | H04L 25/03171 |
| EP | 2926468 | A1 * | 10/2015 | G06F 11/1625 |
| EP | 2926462 | A4 * | 11/2016 | H03M 13/658 |
| EP | 2926468 | A4 * | 1/2017 | H03M 13/612 |
| FR | 2798542 | A1 * | 3/2001 | H04L 25/0204 |
| KR | 20050060631 | A * | 6/2005 | H04L 25/0236 |
| KR | 20080052159 | A * | 6/2008 | H04L 25/0236 |
| KR | 20150123781 | A * | 11/2015 | H03M 13/27 |
| KR | 20150125921 | A * | 11/2015 | H03M 13/2906 |
| KR | 101740600 | B1 * | 5/2017 | H03M 13/112 |
| KR | 20170059018 | A * | 5/2017 | H03M 13/2906 |
| KR | 20190032635 | A * | 3/2019 | H04L 25/0236 |
| KR | 102012706 | B1 * | 8/2019 | H04L 1/0065 |
| KR | 20190097331 | A * | 8/2019 | H05K 999/99 |
| KR | 20190107750 | A * | 9/2019 | H04L 25/022 |
| KR | 102057552 | B1 * | 1/2020 | H03M 13/616 |
| WO | WO-2004066575 | A1 * | 8/2004 | H04L 25/0236 |
| WO | WO-2004102910 | A1 * | 11/2004 | H04L 25/0236 |
| WO | WO-2007028917 | A2 * | 3/2007 | H04B 7/04 |
| WO | WO-2014089087 | A1 * | 6/2014 | H03M 13/1108 |
| WO | WO-2014089092 | A1 * | 6/2014 | H04L 25/0224 |
| WO | WO-2014089096 | A1 * | 6/2014 | H04L 1/0065 |
| WO | WO-2017201467 | A1 * | 11/2017 | H04L 27/01 |
| WO | 2018077771 | A2 | 5/2018 | |
| WO | WO-2019202039 | A1 * | 10/2019 | H04L 25/0236 |

OTHER PUBLICATIONS

A. Dowler, A. Nix and J. McGeehan, "Data-derived iterative channel estimation with channel tracking for a mobile fourth generation wide area OFDM system," GLOBECOM '03. IEEE Global Telecommunications Conference (IEEE Cat. No.03CH37489), 2003, pp. 804-808 vol. 2, doi: 10.1109/GLOCOM.2003.1258350. (Year: 2003).*

F. Delestre, G. Owojaiye and Y. Sun, "An iterative joint channel estimation and data detection technique for MIMO-OFDM systems," 2012 8th International Wireless Communications and Mobile Computing Conference (IWCMC), 2012, pp. 195-199, doi: 10.1109/IWCMC.2012.6314202. (Year: 2012).*

"Short Range Devices; Low Throughput Networks (LTN); Protocols for radio interface A", ETSI Technical Specification TS 103 357 (internal version / attached is the published version of Jun. 2018, (which was released after the filed of the prior application), Jun. 2018.

Chang, Kuor-Hsin, et al., "Iterative Joint Sequence and Channel Estimation for Fast Time-Varying Intersymbol Interference Channels", In Proceedings of the International Conference on Communications (ICC'95), Seattle, p. 357-361.

Crozier, S.N., et al., "Least sum of squared errors (LSSE) channel estimation", IEE Proceedings, 138:371-378.

Delestre, Fabien, et al., "An iterative joint channel estimation and data detection technique for MIMO-OFDM systems", Wireless Communications and Mobile Computing Conference (IWCMC), 2012 8th International, IEEE, Aug. 27, 2012, XP032253301, DOI: 10.1109/IWCMC.2012.6314202 ISBN: 978-1-4577-1378-1, pp. 195-199.

Dowler, Alex, et al., "Data-derived iterative channel estimation with channel tracking for a mobile fourth generation wide area of dm system", GLOBECOM'03. 2003—IEEE Global Telecommunications Conference. Conference Proceedings. San Francisco, CA, Dec. 1-5, 2003; XP010678176, DOI: 10.1109/GLOCOM.2003. 1258350 ISBN: 978-0-7803-797 4-9, pp. 804-808.

Kammeyer, Karl-Dirk, "Nachrichtenübertragung", Teubner-Verlag, ISBN 3-519-26142-1, 3. Edition (only available in German), pp. 453-456 and pp. 522-525.

(56) References Cited

OTHER PUBLICATIONS

Proakis, John G, "Digital Communications", New York, McGraw Hill, 1995, pp. 652-660.

\* cited by examiner

```
                                                                              200
┌─────────────────────────────────────────────────────────────┐
│  Estimating a channel state of a transmission channel       │
│  of the signal based on the received signal to obtain       ├─202
│  first channel state information,                           │
└─────────────────────────────────────────────────────────────┘
                              │
                              ▼
┌─────────────────────────────────────────────────────────────┐
│  Demodulating a first set of received symbols from different partial │
│  data packets using the first channel state information, wherein     │
│  the first set of received symbols is a real subset of the received  │
│  symbols of the at least two partial data packets to obtain a first set │
│  of received encoded bits, wherein the first set of received encoded ├─204
│  bits allows drawing conclusions as to a first set of encoded bits   │
│  corresponding on the transmitter side to the first set of received  │
│  encoded bits, using the transmitter-side redundancy-introducing     │
│  encoding,                                                           │
└─────────────────────────────────────────────────────────────┘
                              │
                              ▼
┌─────────────────────────────────────────────────────────────┐
│  Decoding the first set of received encoded bits to determine │
│  a first set of estimated encoded bits using the transmitter-side ├─206
│  redundancy-introducing encoding,                            │
└─────────────────────────────────────────────────────────────┘
                              │
                              ▼
┌─────────────────────────────────────────────────────────────┐
│  Mapping the first set of estimated bits to estimated        │
│  transmission symbols using a mapping rule matching a        │
│  transmitter-side mapping rule to obtain a first set of      ├─208
│  estimated transmission symbols,                             │
└─────────────────────────────────────────────────────────────┘
                              │
                              ▼
┌─────────────────────────────────────────────────────────────┐
│  Determining second channel state information using the first set ├─210
│  of estimated transmission symbols.                          │
└─────────────────────────────────────────────────────────────┘
```

Fig. 14

DECODER-SUPPORTED ITERATIVE CHANNEL ESTIMATION

CROSS-REFERENCE TO RELATED APPLICATIONS

This application is a continuation of copending International Application No. PCT/EP2019/060006, filed Apr. 17, 2019, which is incorporated herein by reference in its entirety, and additionally claims priority from German Application No. 102018206132.7, filed Apr. 20, 2018, which is also incorporated herein by reference in its entirety.

BACKGROUND IF THE INVENTION

Embodiments relate to a data receiver and, in particular, to a data receiver with iterative channel estimation. Further embodiments relate to a method for receiving data and, in particular, to a method for receiving data with iterative channel estimation. Some embodiments relate to decoder-assisted iterative channel estimation.

In general, a distinction can be made between symbol-assisted, semi-blind and blind methods of channel state estimation. For symbol-assisted channel state estimation in digital transmission systems, there are a number of known methods, such as the established algorithms "Least Sum of Squared Errors" (LSSE) [1], "Minimum Mean Squared Error" (MMSE) [2]. For time-variant transmission channels, the iterative estimation or tracking of an (initial) channel estimation, such as the well-known "Least Mean Squares" (LMS) or "Recursive Least Squares" (RLS) algorithms is used [2]. A further overview can be found in [3], for example.

For the generation or tracking of channel estimates of time-variant transmission channels, channel estimation and demodulation can be performed jointly and iteratively ("Joint Sequence and Channel Estimation"), e.g. [4]. Estimates of the transmitted symbols serve as a basis for tracking.

Traditionally, however, the iterative channel estimation is temporally performed before and independently of decoding. There is no information flow between channel decoding and channel estimation. This is shown in FIG. 1 as an example of the typical basic structure of a digital transmission system in baseband representation.

In detail, FIG. 1 shows a schematic block diagram of a system comprising a data transmitter 12 and a data receiver 14 with iterative channel estimation. The data transmitter 12 comprises a channel encoder (e.g. FEC, forward error correction) 16 configured to encode data bits 15 ($d$) to obtain encoded bits 17 ($c$), an interleaver 18 configured to interleave the encoded bits 17 ($c$) to obtain encoded bits after interleaving 19 ($b$), a modulator (e.g. symbol mapper) 20 configured to map the encoded bits after interleaving 19 ($b$) to transmission symbols 21 ($a$), and a transmission signal generator 22 configured to generate a transmission signal 23 based on the transmission symbols 21 ($a$). The transmission signal 23 is transmitted from the data transmitter 12 via a transmission channel 24 to the data receiver 14, the data receiver 14 receiving a reception signal 25 which is a version of the transmission signal 23 modified by the transmission channel 24. The data receiver 14 comprises a reception filter 26 configured to filter the reception signal 25 to obtain a filtered reception signal 27. Further, the data receiver 14 comprises iterative channel estimation 28 consisting of a demodulator (e.g. symbol estimator or symbol demapper) 30 and a channel state estimator 32, the demodulator 30 being configured to demodulate the filtered reception signal 27 to provide hard bits 31 or soft bits 31. 31, such as LLRs (Log-Likelihood Ratios), and wherein the channel state estimator 32 is configured to provide channel estimates 35 for the demodulator 30 based on the filtered reception signal (27) and based on estimated transmission symbols 33 ($a$). The data receiver 14 also includes a deinterleaver 34 and a channel decoder 36.

The performance of a digital transmission system is determined by its power efficiency, among other things. In many common systems, such as digital radio communication systems according to GSM, UMTS or LTE standard, methods for coherent demodulation of the received signal are used, which entail channel estimation as a prerequisite. The quality of the channel estimation has a significant influence on the error rate during data transmission (e.g. packet error rate) and thus its power efficiency.

SUMMARY

An embodiment may have a data receiver, wherein the data receiver is configured to receive a signal, the signal having at least two separate partial data packets, wherein the at least two separate partial data packets have symbols which map encoded bits resulting from a redundancy-introducing encoding of a data bit sequence performed jointly for the at least two separate partial data packets, wherein the data receiver is configured to estimate a channel state of a transmission channel of the signal based on the received signal to obtain first channel state information, wherein the data receiver is configured to demodulate a first set of received symbols from different partial data packets using the first channel state information, wherein the first set of received symbols is a real subset of the received symbols of the at least two partial data packets to obtain a first set of received encoded bits, wherein the first set of received encoded bits allows drawing conclusions as to a first set of encoded bits corresponding on the transmitter side to the first set of received encoded bits, using the transmitter-side redundancy-introducing encoding, wherein the data receiver is configured to decode the first set of received encoded bits to determine, using the transmitter-side redundancy-introducing encoding, a first set of estimated encoded bits, which corresponds to a first set of transmitted encoded bits with higher probability than the received encoded bits, and to map the first set of estimated encoded bits to estimated transmission symbols using a mapping rule matching a transmitter-side mapping rule to obtain a first set of estimated transmission symbols; wherein the data receiver is configured to determine second channel state information using the first set of estimated transmission symbols; wherein the data receiver is configured to demodulate a second set of received symbols from different partial data packets using the second channel state information, wherein the second set of received symbols is a real subset of the received symbols of the at least two partial data packets to obtain a second set of received encoded bits; wherein the second set of received symbols in the respective partial data packet has a greater temporal spacing to pilot symbols of the at least two partial data packets than the first set of received symbols.

Another embodiment may have a data receiver for receiving a signal, the signal having at least two separate partial data packets, wherein the at least two separate partial data packets have 1/B·R·N symbols which map R·N encoded bits resulting from a redundancy-introducing encoding of N data bits with a code rate of 1/R, performed together for the at least two separate partial data packets, B indicating the number of encoded bits mapped per symbol, wherein the data receiver is configured to estimate a channel state of a transmission channel of the signal based on the received signal to obtain-th channel state information, wherein the data receiver is configured to, in each iteration step k with k=1 to K of a sequence of K iteration steps, demodulate a k-th set of received symbols from different partial data packets using the k-th channel state information, the k-th set of received symbols being a real subset of the R·N received symbols of the at least two partial data packets, to obtain a k-th set of received encoded bits, wherein the k-th set of received encoded bits allows drawing conclusions as to a k-th set of encoded bits corresponding on the transmitter side to the k-th set of received encoded bits, using the transmitter-side redundancy-introducing encoding, decode the k-th set of received encoded bits to determine a k-th set of estimated encoded bits using the transmitter-side redundancy-introducing encoding, and to map the k-th set of estimated bits to estimated transmission symbols using a mapping rule mapping a transmitter-side mapping rule to obtain a k-th set of estimated transmission symbols; determine k+1-th channel state information using the k-th set of estimated transmission symbols.

According to another embodiment, a method for receiving a signal, the signal having at least two separate partial data packets, wherein the at least two separate partial data packets have symbols which map encoded bits resulting from a redundancy-introducing encoding of a data bit sequence performed jointly for the at least two separate partial data packets, may have the steps of: estimating a channel state of a transmission channel of the signal based on the received signal to obtain first channel state information, demodulating a first set of received symbols from different partial data packets using the first channel state information, wherein the first set of received symbols is a real subset of the received symbols of the at least two partial data packets to obtain a first set of received encoded bits, wherein the first set of received encoded bits allows drawing conclusions as to a first set of encoded bits corresponding on the transmitter side to the first set of received encoded bits, using the transmitter-side redundancy-introducing encoding, decoding the first set of received encoded bits to determine a first set of estimated encoded bits using the transmitter-side redundancy-introducing encoding, mapping the first set of estimated encoded bits to estimated transmission symbols using a mapping rule matching a transmitter-side mapping rule to obtain a first set of estimated transmission symbols; determining second channel state information using the first set of estimated transmission symbols; and demodulating a second set of received symbols from different partial data packets using the second channel state information, wherein the second set of received symbols is a real subset of the received symbols of the at least two partial data packets to obtain a second set of received encoded bits; wherein the second set of received symbols in the respective partial data packets has greater a temporal spacing to pilot symbols of the at least two partial data packets than the first set of received symbols.

Still another embodiment may have a non-transitory digital storage medium having stored thereon a computer program for performing a method for receiving a signal, the signal having at least two separate partial data packets, wherein the at least two separate partial data packets have symbols which map encoded bits resulting from a redundancy-introducing encoding of a data bit sequence performed jointly for the at least two separate partial data packets, the method having the steps of: estimating a channel state of a transmission channel of the signal based on the received signal to obtain first channel state information, demodulating a first set of received symbols from different partial data packets using the first channel state information, wherein the first set of received symbols is a real subset of the received symbols of the at least two partial data packets to obtain a first set of received encoded bits, wherein the first set of received encoded bits allows drawing conclusions as to a first set of encoded bits corresponding on the transmitter side to the first set of received encoded bits, using the transmitter-side redundancy-introducing encoding, decoding the first set of received encoded bits to determine a first set of estimated encoded bits using the transmitter-side redundancy-introducing encoding, mapping the first set of estimated encoded bits to estimated transmission symbols using a mapping rule matching a transmitter-side mapping rule to obtain a first set of estimated transmission symbols; determining second channel state information using the first set of estimated transmission symbols; and demodulating a second set of received symbols from different partial data packets using the second channel state information, wherein the second set of received symbols is a real subset of the received symbols of the at least two partial data packets to obtain a second set of received encoded bits; wherein the second set of received symbols in the respective partial data packets has greater a temporal spacing to pilot symbols of the at least two partial data packets than the first set of received symbols, when said computer program is run by a computer.

Embodiments provide a data receiver, the data receiver being configured to receive a signal, the signal comprising at least two separate partial data packets, the at least two separate partial data packets comprising symbols which represent encoded bits resulting from redundancy-introducing encoding of a data bit sequence, performed jointly for the at least two separate partial data packets, the data receiver [e.g. comprising a channel state estimator] configured to estimate a channel state of an transmission channel of the signal based on the received signal [e.g. at first based on pilot symbols of the separate partial data packet] to obtain first channel state information, wherein the data receiver [e.g. comprises a demodulator/demapper] configured to demodulate a first set of receives symbols from different partial data packets using the first channel state information, wherein the first set of received symbols is a real subset of the received symbols of the at least two partial data packets to obtain a first set of received encoded bits [e.g. wherein the first set of received symbols is selected to enable reconstruction of the first set of received encoded bits], wherein the first set of received encoded bits [e.g. separately (e.g. independently of other received symbols and/or independently of other received encoded bits)] allows drawings conclusions as to a first set of encoded bits corresponding on the transmitter side to the first set of received encoded bits, the data receiver (e.g. comprising a transmission symbol estimator) configured to decode [e.g. independently of other encoded data bits contained in the partial data packets (partial decoding)], to determine a first set of estimated encoded bits using the transmitter-side redundancy-introducing encoding, [e.g. which most likely corresponds to the first set of encoded bits], and to map the first set of estimated bits to estimated transmission symbols using a mapping rule matching a transmitter-side mapping rule to obtain a first set of estimated transmission symbols, wherein the data receiver [e.g. the channel state estimator] is configured to determine second channel state information [e.g. updated or extended channel state information] using the first set of estimated transmission symbols.

In embodiments, a decoder-assisted, iterative estimation of a potentially time-variant transmission channel is performed in the receiver of a digital transmission system. The channel state estimation is performed on the basis of estimated symbols or a combination of previously known and estimated symbols. The symbols to be estimated are generated on the transmitter side by means of channel encoding, e.g. forward error correction (FEC), introducing redundancy from the source bits of the message to be transmitted.

The estimation accuracy of a symbol-assisted channel state estimation, which is based on symbols unknown before to the receiver, correlates strongly with the quality of the symbol estimation.

The present invention is based on the idea of increasing (e.g. significantly) the quality of the estimation of the encoded (e.g. FEC-coded) symbols unknown before to the receiver by performing an accompanying, continuous partial decoding of the symbols which can be estimated up to the respective time instant in the course of the iterative channel estimation. Thus, the decoding gain can already be used during the channel estimation. In embodiments, this can improve the quality of the estimation of transmission symbols (as input variables of the channel state estimation).

Embodiments provide a qualitatively improved channel estimation especially for time-variant transmission channels and thus lead to an improved performance of the entire transmission system. This results in a higher reliability of the transmission at a given disturbance (lower error rate) or in a higher robustness against disturbances of the transmission at a given error rate, for example.

Advantageous further developments of the present invention are described below.

In embodiments, the at least two separate partial data packets contain encoded bits [or symbols representing the encoded bits] which originate from a (single) encoded data bit sequence.

In embodiments, the encoding on the data transmitter side is performed together for the at least two separate partial data packets, i.e., only one (single) encoding is performed and the encoded data are then divided onto the partial data packets.

In embodiments, the first set of received symbols in the respective partial data packets can be arranged [e.g. immediately] adjacent to pilot symbols of the at least two partial data packets.

In embodiments, a first part [e.g. a first half] of the first set of received symbols in the respective partial data packets can be arranged temporally [e.g. immediately] before the pilot symbols of the at least two partial data packets, wherein a second part [e.g. a second half] of the first set of received symbols in the respective partial data packets can be arranged temporally [e.g. immediately] after the pilot symbols of the at least two partial data packets.

In embodiments, the data receiver [or the demodulator/demapper of the data receiver] can be configured to demodulate a second set of received symbols from different partial data packets using the second channel state information, the second set of received symbols being a real subset of the received symbols of the at least two partial data packets to obtain a second set of received encoded bits.

In embodiments, the second set of received symbols in the respective partial data packets can have a larger time interval to pilot symbols of the at least two partial data packets than the first set of received symbols.

In embodiments, the second set of received symbols in the respective partial data packets can be placed [e.g. immediately] adjacent to the first set of received symbols.

In embodiments, a first part [e.g. a first half] of the second set of received symbols in the respective partial data packets can be arranged temporally before the first part of the first set of received symbols, wherein a second part [e.g. a second half] of the second set of received symbols in the respective partial data packets can be arranged temporally after the second part of the first set of received symbols.

In embodiments, the data receiver [or the channel state estimator of the data receiver] can be configured to at first estimate the channel state of the transmission channel based on pilot symbols of the at least two separate partial data packets to obtain the first channel state information.

In embodiments, the data receiver [or the channel state estimator of the data receiver] can be configured to estimate the channel state using the first set of estimated transmission symbols to obtain the second channel state information.

In embodiments, the data receiver [or the channel state estimator of the data receiver] can be configured to estimate the channel state of the transmission channel for each of the at least two separate partial data packets.

In embodiments, the first set of received symbols can be selected such that the first set of received symbols allows reconstruction of the first set of received encoded bits.

In embodiments, the first set of received encoded bits can, independently of other received symbols and/or independently of other received encoded bits, allow drawing conclusions as to at least one first data bit to be transmitted by exploiting an coding gain [partial decoding].

In embodiments, the data receiver [or the transmit symbol estimator of the data receiver] can be configured to decode the first set of received encoded bits using transmitter-side redundancy-introducing encoding.

In embodiments, the data receiver [or the transmission symbol estimator of the data receiver] can be configured to decode the first set of received encoded bits using a Viterbi decoder.

In embodiments, the data receiver can be configured to select the first set of received symbols from the received symbols of the at least two separate partial data packets based on an interleaving pattern known to the data receiver, the interleaving pattern matching a transmitter-side interleaving pattern based on which the encoded bits are divided on the data transmitter side interleaved among the at least two separate partial data packets.

In embodiments, the interleaving pattern can have a cyclic shift of a given number of encoded bits [e.g. of 48 bits].

In embodiments, the data receiver [or the demodulator of the data receiver] can be configured to demodulate the first set of received symbols and to estimate a reliability for the first set of encoded bits or each encoded bit of the first set of encoded bits [soft decision demodulation] to obtain additionally reliability information for the first set of encoded bits.

In embodiments, the data receiver [or the demodulator/demapper of the data receiver] can be configured to estimate a first set of received encoded bits from the first set of received symbols in the form of hard/binary decisions (hard-output) or with (additionally) providing reliability information (soft decision or soft-output).

For example, a distinction can be made between demodulation or symbol estimation with reliability information (soft-decision or soft-bit demodulation) and demodulation or symbol estimation without reliability information (hard-decision or hard-bit demodulation). Demodulation or symbol estimation with reliability information does not provide a "hard"-decision bit but reliability information, e.g. P(bit=0)=P0, P(bit=1)=1−P0. A log-likelihood ratio (LLR) is a possible logarithmic representation, here e.g.: LLR=log (P0/(1−P0)).

In embodiments, the data receiver [or the transmission symbol estimator of the data receiver] can be configured to provide a first set of estimated transmission symbols with reliability information based on the first set of received encoded bits.

For example, "hard" symbols (=symbols without reliability information) or "soft" symbols (=symbols with reliability information) may be present at the input of the channel state estimator of the data receiver, provided that the transmission symbol estimator provides "soft" symbols.

In embodiments, the transmission symbol estimator can provide "soft" symbols at its output, regardless of whether "hard" or "soft" bits are present at its input. Advantageously, "soft" bits are present at the input of the transmission symbol estimator.

For example, in some embodiments, the data receiver can be configured to provide the estimated encoded bits with reliability information (as a result of partial decoding) to obtain reliability information for the estimated transmission symbols based on the estimated encoded bits with the reliability information.

In embodiments, the data receiver can comprise at least two antennas, wherein the data receiver can be configured to receive the signal with the at least two antennas to obtain at least two received signals, wherein the data receiver [or the demodulator/demapper of the data receiver] can be configured to combine [e.g. by means of maximum ratio combining] and demodulate symbols of the at least two reception signals.

In embodiments, the at least two separate partial data packets can be spaced apart from one another in time and/or frequency.

In embodiments, the at least two separate partial data packets [in the OSI model] can correspond to data packets of the bit transmission layer [physical layer].

Further embodiments provide a data receiver for receiving a signal, the signal comprising at least two separate partial data packets, wherein the at least two separate partial data packets comprise (1/B)*(R*N) symbols which represent R*N encoded bits resulting from encoding N data bits with a code rate of 1/R which introduces redundancy and is performed jointly for the at least two separate partial data packets, the data receiver being configured to estimate, based on the received signal, a channel state of a transmission channel of the signal to obtain (k=1)-th channel state information, where B indicates the number of encoded bits mapped per symbol, the data receiver being configured, in each iteration step k, with k=1 to K, of a sequence of K iteration steps:

using the k-th channel state information, to demodulate a k-th set of received symbols from different partial data packets, wherein the k-th set of received symbols is a real subset of the R*N received symbols of the at least two partial data packets to obtain a k-th set of received encoded bits, the k-th set of received encoded bits allowing drawing conclusions as to a k-th set of encoded bits corresponding on the transmitter side to the k-th set of received encoded bits, using the transmitter-side redundancy-introducing encoding, to decode the k-th set of received encoded bits to determine a k-th set of estimated encoded bits using the transmitter-side redundancy-introducing encoding, and to map the k-th set of estimated bits to estimated transmission symbols using a mapping rule matching a transmitter-side mapping rule to obtain a k-th set of estimated transmission symbols;

to determine (k+1)-th channel state information using the k-th set of estimated transmission symbols [and e.g. the (k−1)-th set of estimated transmission symbols].

In embodiments, R can be a natural number greater than one. R can be a non-natural number too, e.g. in case of dotting.

In embodiments, N can be a natural number greater than one.

In embodiments, K can be a natural number greater than one.

In embodiments, B can be a natural number greater than or equal to one.

In embodiments, the (k+1)-th set of received symbols in the respective partial data packets can be arranged [e.g. immediately] adjacent to the k-th set of received symbols.

In embodiments, the data receiver can be configured to estimate the channel state of the transmission channel based on pilot symbols of the at least two separate partial data packets to obtain the (k=1)-th channel state information.

Further embodiments provide a method for receiving a signal, the signal comprising at least two separate partial data packets, the at least two separate partial data packets comprising symbols which represent encoded bits resulting from a redundancy-introducing encoding of a data bit sequence performed jointly for the at least two separate partial data packets. The method comprises a step of estimating a channel state of a transmission channel of the signal based on the received signal to obtain first channel state information. Further, the method comprises a step of demodulating a first set of received symbols from different partial data packets using the first channel state information, the first set of received symbols being a real subset of the received symbols of the at least two partial data packets to obtain a first set of received encoded bits, the first set of received encoded bits allowing drawing conclusions as to a first set of encoded bits corresponding at the transmitter side to the first set of received encoded bits using the transmitter-side redundancy-introducing encoding. The method further comprises a step of decoding the first set of received encoded bits to determine a first set of estimated encoded bits utilizing the transmitter-side redundancy-introducing encoding. The method further comprises a step of mapping the first set of estimated encoded bits to estimated transmission symbols using a mapping rule matching a transmitter-side mapping rule to obtain a first set of estimated transmission symbols. The method further comprises a step of determining second channel state information using the first set of estimated transmission symbols.

BRIEF DESCRIPTION OF THE DRAWINGS

Embodiments of the present invention are described in more detail with reference to the enclosed figures, in which:

FIG. 14 shows a flowchart of a method for receiving a signal according to an embodiment.

DETAILED DESCRIPTION OF THE INVENTION

Figure 1:
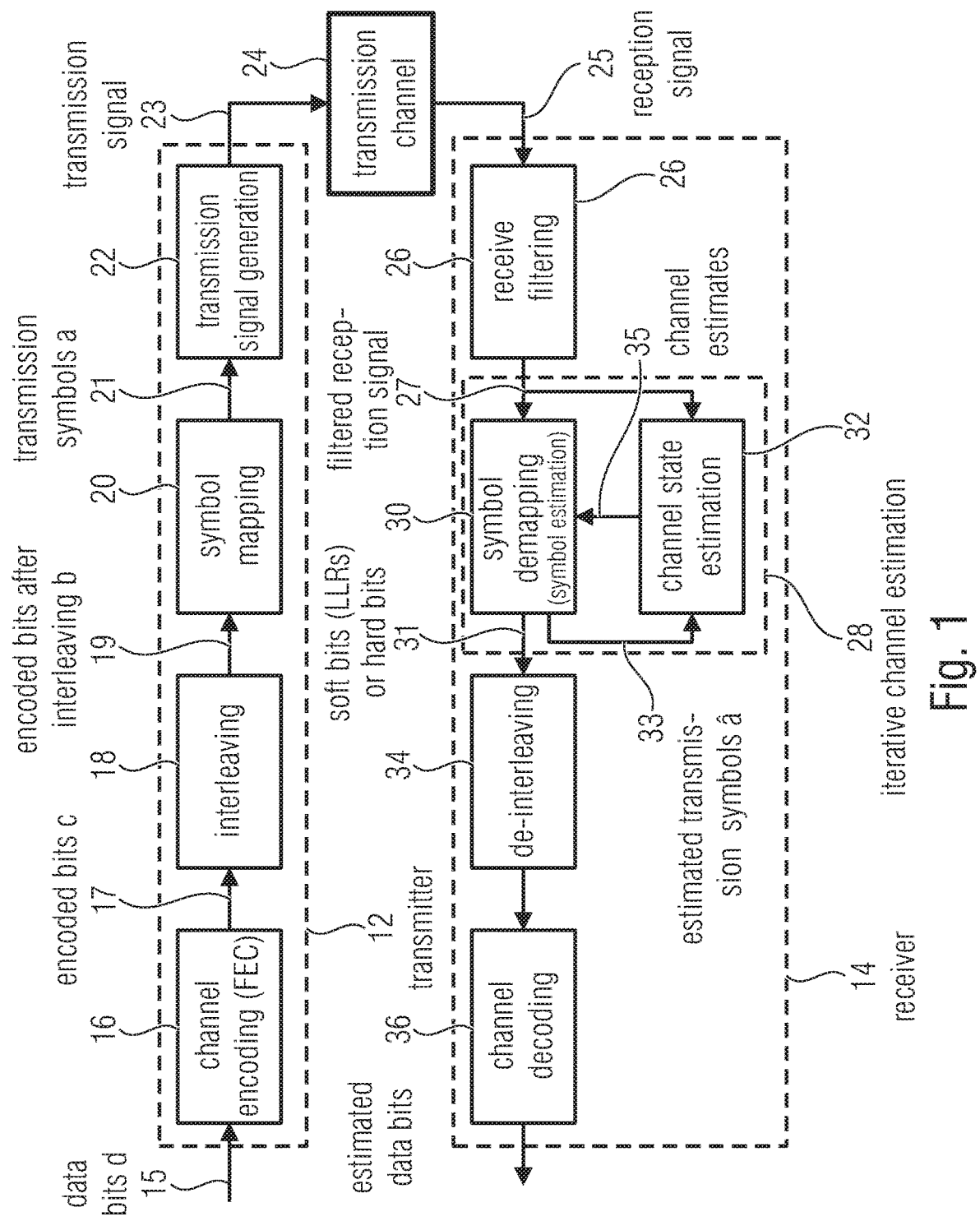
FIG. 1 shows a schematic block diagram of a system comprising a data transmitter and a data receiver with iterative channel estimation.

In the following description of the embodiments of the present invention, the same reference numerals are used in the figures for identical or similarly acting elements, so that their description is interchangeable.

In the following description of the embodiments of the present invention, a distinction is made between the terms "channel estimation" and "channel state estimation" in order to avoid ambiguities. Thus, in embodiments, a symbol-assisted channel state estimation is a single processing step in the overall context of channel estimation, which estimates, for example, the (e.g. instantaneous) state of a transmission channel at a desired time instant from a suitable section of a reception signal and/or a sequence (e.g. estimated or previously known) of transmission symbols. Furthermore, in embodiments, the term channel estimation refers to a method with several processing steps, which aims at the estimation of an unknown transmission channel (at possibly many different time instants) and which includes the channel state estimation as a specific method step.

Figure 2:
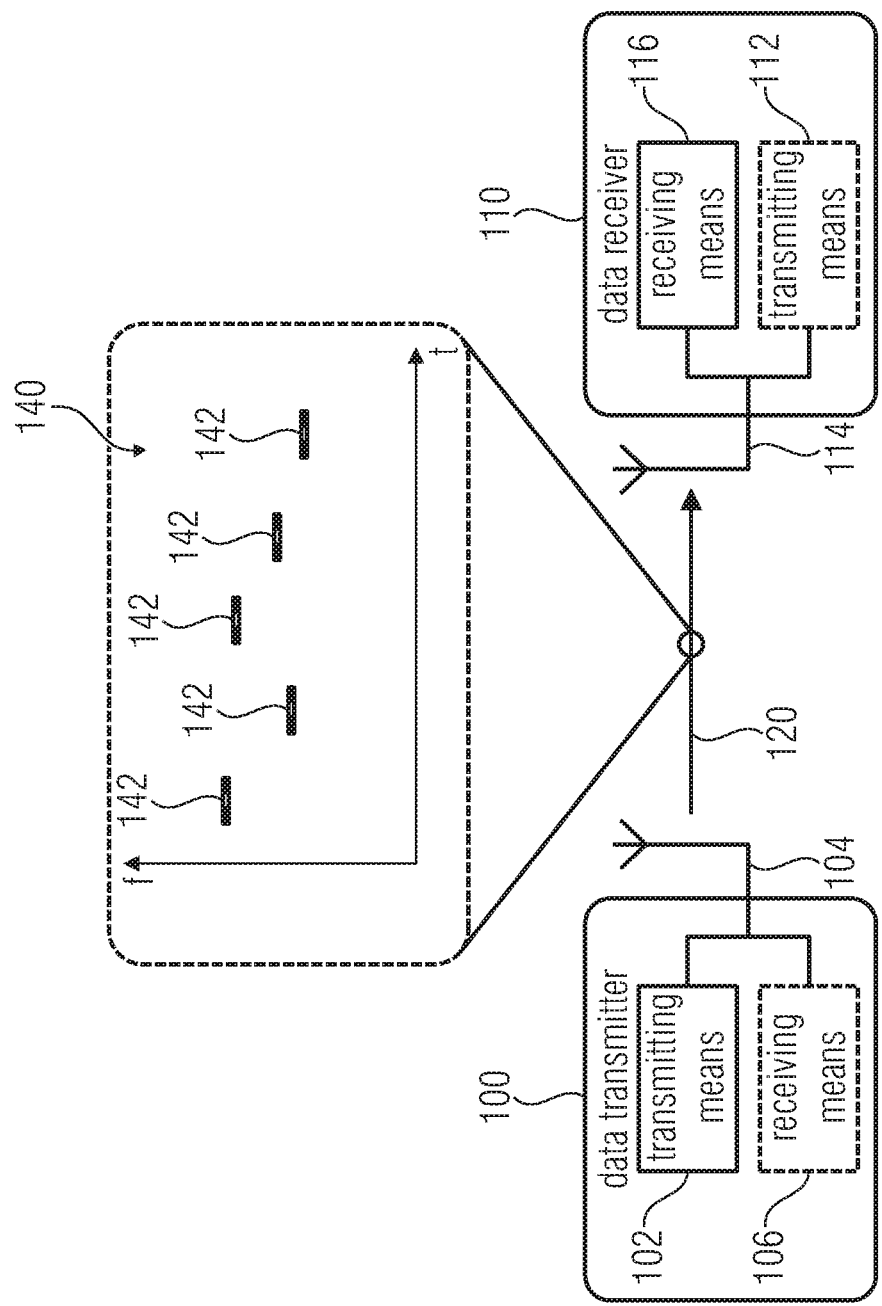
FIG. 2 shows a schematic block diagram of a system comprising a data transmitter and a data receiver, according to an embodiment of the present invention.

FIG. 2 shows a schematic block diagram of a system comprising a data transmitter 100 and a data receiver 110. The data transmitter 100 can be configured to transmit a signal 120, the signal 120 comprising at least two separate partial data packets 142. The data receiver 110 can be configured to receive the signal 120 (or a version of the signal 120 modified by the transmission channel)) which comprises the at least two separate partial data packets 142.

As can be seen in FIG. 2, the at least two separate partial data packets 142 are separated or spaced from one another in time and/or frequency. The distribution of the at least two separate partial data packets 142 in time and/or frequency can be done according to a hopping pattern 140.

In embodiments, the data transmitter 100 can comprise transmitting means (or a transmitter module or transmitter) 102 configured to transmit the signal 120. The transmitting means 102 can be connected to an antenna 104 of the data transmitter 100. The data transmitter 100 can also comprise receiving means (or a receiver module or receiver) 106 configured to receive a signal. The receiving means 106 can be connected to the antenna 104 or another (separate) antenna of the data transmitter 100. The data transmitter 100 can also comprise a combined transceiver.

In embodiments, the data receiver 110 can comprise receiving means (or a receive module or receiver) 116 configured to receive the signal 120. The receiver 116 can be connected to an antenna 114 of the data receiver 110. In addition, the data receiver 110 can comprise transmitting means (or a transmitter module or transmitter) 112 configured to transmit a signal. The transmitting means 112 can be connected to the antenna 114 or another (separate) antenna of the data receiver 110. The data receiver 110 can also comprise a combined transceiver.

In embodiments, the data transmitter 100 can be a sensor node, while the data receiver 110 can be a base station. Typically, a communication system comprises at least one data receiver 110 (base station) and a plurality of data transmitters (sensor nodes, such as heating meters). Of course, it is also possible for the data transmitter 100 to be a base station, while the data receiver 110 is a sensor node. It is also possible for both the data transmitter 100 and the data receiver 110 to be sensor nodes. It is also possible for both the data transmitter 100 and the data receiver 110 to be base stations.

The data transmitter 100 and the data receiver 110 can be configured to transmit and receive data using a telegram splitting method. A data packet (or telegram) containing the data is divided into a plurality of partial data packets (or sub-data packets) 142 and the partial data packets 142 are transmitted from the data transmitter 100 to the data receiver 110 according to a hopping pattern 140 distributed in time and/or frequency, wherein the data receiver 110 reassembles (or combines) the partial data packets 142 to obtain the actual data packet. Each of the partial data packets 142 contains only a part of the data packet 120, and the data packet can also be channel-encoded, so that only a part of the partial data packets 142 is used for error-free decoding of the data packet, rather than all of the partial data packets 142.

As already mentioned, the temporal distribution of the majority of partial data packets 142 can be performed according to a time and/or frequency hopping pattern 140.

A time hopping pattern can specify a sequence of transmission instants or transmission time intervals at which the partial data packets are sent. For example, a first partial data packet can be sent at a first transmission instant (or in a first transmission time slot) and a second partial data packet at a second transmission instant (or in a second transmission time slot), where the first transmission instant and the second transmission instant are different. The time hopping pattern can define (or predetermine or specify) the first transmission instant and the second transmission instant. Alternatively, the time hopping pattern can specify the first transmission instant and a time interval between the first transmission instant and the second transmission instant. Of course, the time hopping pattern can also specify only the time interval between the first transmission instant and the second transmission instant. Between the partial data packets, there may be transmission pauses in which no transmission takes place. The partial data packets can also overlap in time.

A frequency hopping pattern can specify a sequence of transmission frequencies or transmission frequency hops with which the partial data packets are transmitted. For example, a first partial data packet can be transmitted at a first transmission frequency (or in a first frequency channel) and a second partial data packet can be transmitted at a second transmission frequency (or in a second frequency channel), where the first transmission frequency and the second transmission frequency are different. The frequency hopping pattern can define (or predetermine or specify) the first transmission frequency and the second transmission frequency. Alternatively, the frequency hopping pattern can specify the first transmission frequency and a frequency interval (transmission frequency hop) between the first transmission frequency and the second transmission frequency. Of course, the frequency hopping pattern can also specify only the frequency interval (transmission frequency hop) between the first transmission frequency and the second transmission frequency.

Of course, the majority of partial data packets 142 can also be transmitted from the data transmitter 100 to the data receiver 110 distributed both in time and frequency. The distribution of the plurality of partial data packets in time and frequency can be performed according to a time and frequency hopping pattern. A time and frequency hopping pattern can be the combination of a time hopping pattern and a frequency hopping pattern, i.e. a sequence of transmission instants or transmission time intervals with which the partial data packets 142 are transmitted, wherein the transmission frequencies (or transmission frequency hops) are assigned to the transmission instants (or transmission time intervals).

Figure 3:
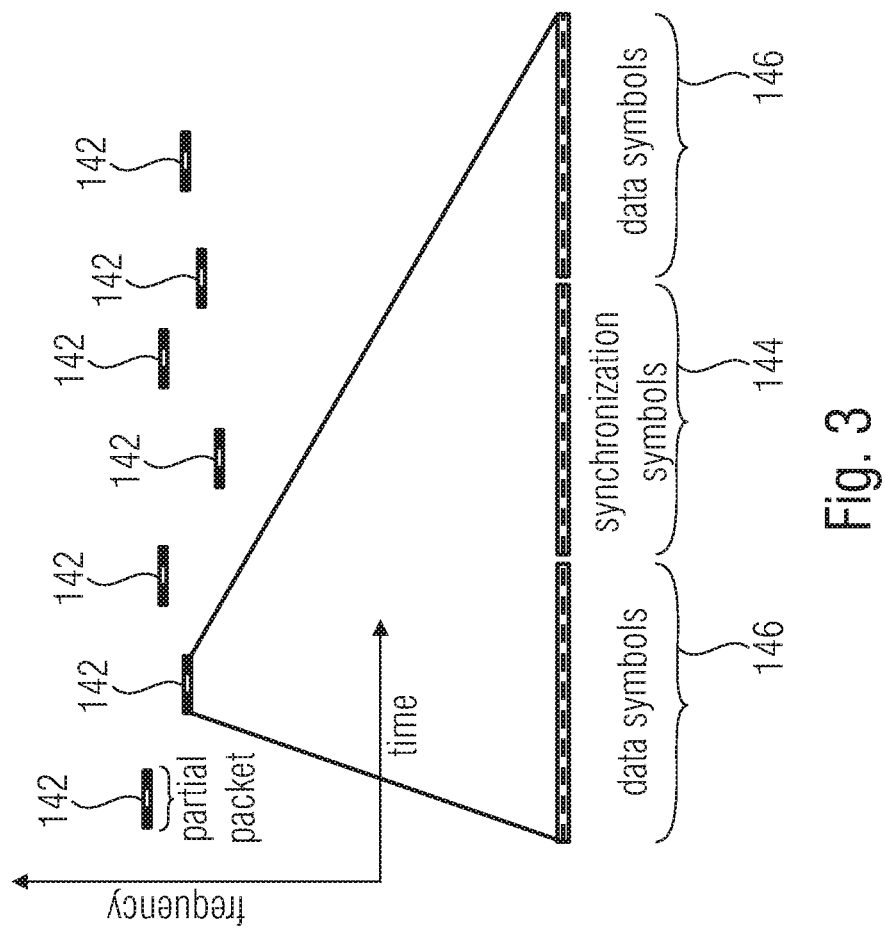
FIG. 3 shows an occupancy of the transmission channel during the transmission of a plurality of sub data packets according to a time and frequency hopping pattern in a diagram.

FIG. 3 shows an occupancy of the transmission channel during the transmission of a plurality of partial data packets 142 according to a time and frequency hopping pattern in a diagram. The ordinate describes the frequency and the abscissa time.

As can be seen in FIG. 3, the data packet 120 can exemplarily be divided into n=7 partial data packets 142 and transmitted from the data transmitter 100 to the data receiver 110 distributed in time and frequency according to a time and frequency hopping pattern.

As shown further in FIG. 3, the plurality of partial data packets 142 can contain pilot sequences (pilot symbols (or synchronization symbols) 144 in FIG. 3) in addition to data (data symbols 146 in FIG. 3). Depending on the temporal position within the partial data packets, these are also called preamble (preceding the sequence of data symbols) or midamble (embedded between sequences of data symbols).

Detailed embodiments of the data receiver 110 with iterative channel estimation are described below in more detail.

Figure 4:
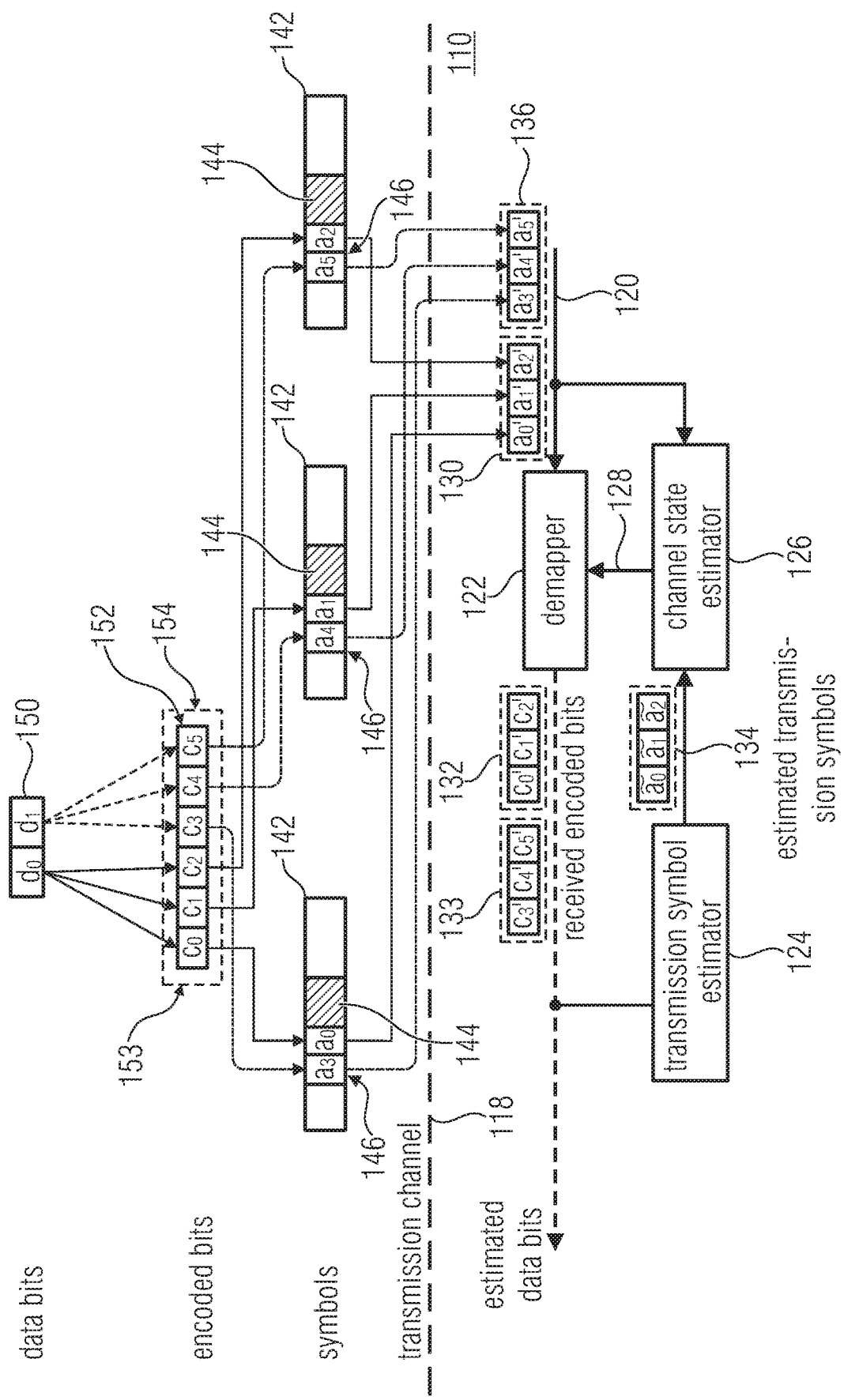
FIG. 4 shows a schematic block diagram of a data receiver with iterative channel estimation, according to an embodiment of the present invention

FIG. 4 shows a schematic block diagram of a data receiver 110 with iterative channel estimation, according to an embodiment of the present invention The data receiver 110 is configured to receive a signal 120 (e.g. from the data transmitter 100 (see FIG. 2)), the signal 120 comprising at least two separate partial data packets 142, wherein the at least two separate partial data packets 142 comprise symbols 146 ($a_0, a_1, a_2, a_3, a_4, a_5, a_6, \ldots, a_{M-N}$), which map encoded bits 152 ($c_0, c_1, c_2, c_3, c_4, c_5, c_6, \ldots, c_{M-N}$) which result from redundancy-introducing encoding (e.g. with a code rate of 1/R) of a data bit sequence 150 ($d_0, d_1, \ldots, d_N$) performed together for the at least two separate partial data packets 142. In embodiments, R and N can be natural numbers greater than one.

As exemplarily shown in FIG. 4, the data receiver 110 can comprise a demodulator (e.g. a symbol demapper) 122, a transmission symbol estimator 124 and a channel state estimator 126. Of course, the data receiver 110 can also be implemented by means of a processor, microprocessor, or other programmable logic circuit, in which case the circuit blocks shown in FIG. 4 can be implemented, for example, by corresponding algorithms.

In embodiments, the channel state estimator 126 can be configured to estimate a channel state of a transmission channel 118 of the signal 120 based on the received signal 120 to obtain first channel state information 128.

For example, the channel state estimator 126 can be configured to at first (i.e. in a first iteration step (k=1)) estimate the channel state of the transmission channel 118 based on pilot symbols 144 of the at least two separate partial data packets 142 to obtain the first channel state information 128.

In embodiments, the demodulator 122 can be configured to demodulate a first set of received symbols 132 ($a_0', a_1', a_2'$) from different partial data packets 142 using the first channel state information 128, the first set of received symbols 130 ($a_0', a_1', a_2'$) being a real subset of the received symbols 146' ($a_0', a_1', a_2', a_3', a_4', a_5', a_6', \ldots, a_{R-N-1}'$) of the at least two separate partial data packets 142 to obtain a first set of received encoded bits 132 ($c_0', c_1', c_2'$).

For example, the first set of received symbols 130 ($a_0', a_1', a_2'$) can be selected to allow reconstruction of the first set of received encoded bits 132 ($c_0', c_1', c_2'$).

In embodiments, the first set of received encoded bits 132 ($c_0', c_1', c_2'$) can (e.g. separately (e.g. independently of other received symbols and/or independently of other received encoded bits)) allow drawing conclusions as to a first set of encoded bits 153 ($c_0, c_1, c_2$) corresponding on the transmitter side to the first set of received encoded bits 132 ($c_0', c_1', c_2'$) by utilizing the transmitter-side redundancy-introducing coding.

For example, the first set of bits 153 ($c_0, c_1, c_2$) encoded on the transmitter side can be mapped to a first set of symbols ($a_0, a_1, a_2$) on the transmitter side, the first set of received symbols 130 ($a_0', a_1', a_2'$) being the version of the first set of symbols ($a_0, a_1, a_2$) received by the data receiver 110.

For example, the first set of received encoded bits 132 ($c_0', c_1', c_2'$) (e.g. independently of other received symbols and/or independently of other received encoded bits) can allow drawing conclusions as to at least one first data bit 150 ($d_0$) to be transmitted using a coding gain (e.g. allow partial decoding of the transmission sequence with achieving a coding gain).

In embodiments, the transmission symbol estimator 124 can be configured to decode the first set of received encoded bits 132 ($c_0'$, $c_1'$, $c_2'$) (e.g. independently of other encoded data bits contained in the at least two separate partial data packets 142 (partial decoding)) to determine a first set of estimated encoded bits (e.g. a first set of encoded bits most likely to correspond to the transmitter-side encoded bits 153 ($c_0$, $c_1$, $c_2$), but at least more likely than the received encoded bits 132 ($c_0'$, $c_1'$, $c_2'$)) using the transmitter-side redundancy-introducing encoding, and to map the first set of estimated bits to estimated transmission symbols using a mapping rule matching a transmitter-side mapping rule to obtain a first set of estimated transmission symbols 134 ($\tilde{a}_0$, $\tilde{a}_1$, $\tilde{a}_2$).

For example, the transmission symbol estimator 124 can be configured to decode the first set of received encoded bits 132 ($c_0'$, $c_1'$, $c_2'$) to obtain an estimate for the at least first data bit 150 ($d_0$), and to re-encode the estimated at least first data bit 150 ($d_0$) to obtain the first set of estimated bits.

For example, the transmission symbol estimator 124 can be configured to use a Viterbi decoder for partial decoding of the received encoded bits 132 ($c_0'$, $c_1'$, $c_2'$) when convolutional encoding is applied at the transmitter side, wherein in the course of partial decoding, the most probable path in the trellis diagram is determined and the encoded bits associated with this path are obtained as the first set of estimated bits.

In embodiments, the channel state estimator 126 can be further configured to estimate (e.g. in a second iteration step (k+1=2)) second channel state information 128 (e.g. updated or extended channel state information) using the first set of estimated transmission symbols 134 ($a_0$, $a_1$, $a_2$), wherein the first set of estimated transmit symbols 134 ($a_0$, $a_1$, $a_2$) [in case of a disturbed transmission] is more likely to correspond to the first set of transmitted symbols 146 ($a_0$, $a_1$, $a_2$) than the received symbols 130 ($a_0'$, $a_1'$, $a_2'$).

For example, the channel state estimator 126 can be configured to estimate the channel state using the first set of estimated transmission symbols 134 ($\tilde{a}_0$, $\tilde{a}_1$, $\tilde{a}_2$) (and e.g. using a previous set of estimated transmission symbols and/or using pilot symbols 144) to obtain the second channel state information 128.

In embodiments, the demodulator 122 can also be configured to (e.g. in the second iteration step (k+1=2)) demodulate a second set of received symbols 136 ($a_3'$, $a_4'$, $a_5'$) from different partial data packets 142 using the second channel state information 128, the second set of received symbols 136 ($a_3'$, $a_4'$, $a_5'$) being a real subset of the received symbols 146' ($a_0'$, $a_1'$, $a_2'$, $a_3'$, $a_4'$, $a_5'$, $a_6'$, ..., $a_{R-N-1}'$) of the at least two partial data packets 142 to obtain a second set of received encoded bits 133 ($c_3'$, $c_4'$, $c_5'$).

In embodiments, the second set of received encoded bits 133 ($c_3'$, $c_4'$, $c_5'$) (e.g. separately (e.g. independently of other received symbols and/or independently of other received encoded bits)) can allow drawing conclusions as to a second set of encoded bits 154 ($c_3$, $c_4$, $c_5$) corresponding at the transmitter side to the second set of received encoded bits 133 ($c_0'$, $c_4'$, $c_5'$) using the transmitter-side redundancy-introducing encoding.

As can be seen in FIG. 4, in embodiments, the first set of received symbols 130 ($a_0'$, $a_1'$, $a_2'$) in the respective partial received data packets 142 can be located [e.g. immediately] adjacent to pilot symbols 144 of the at least two separate partial data packets 142, while the second set of received symbols 136 ($a_3'$, $a_4'$, $a_5'$) in the respective partial data packets 142 comprises a greater temporal distance to pilot symbols 144 of the at least two separate partial data packets 142 than the first set of received symbols 130 ($a_0'$, $a_1'$, $a_2'$). For example, the second set of received symbols 136 ($a_3'$, $a_4'$, $a_5'$) in the respective partial data packets 142 can be located [e.g. immediately] adjacent to the first set of received symbols 130 ($a_0'$, $a_1'$, $a_2'$).

The present invention is based on the idea of using the coding gain achievable by channel encoding (e.g. in the form of introduced redundancy) or at least a part of it already for the iterative channel estimation. In contrast to the data receiver shown in FIG. 1, in embodiments, the estimates of the transmission symbols 134 used for the channel state estimation are obtained by continuously (iteratively) performing partial decoding of the transmitted message in additional decoding processes. The term "partial decoding" means that only that part of the message is decoded which can be decoded on the basis of the receive symbols 130, 136 available at the respective instant of partial decoding.

After the partial decoding, which yields estimated encoded bits, interleaving and symbol mapping are performed, which generates the estimated transmit symbols 134 based on the partial decoding result.

Figure 5:
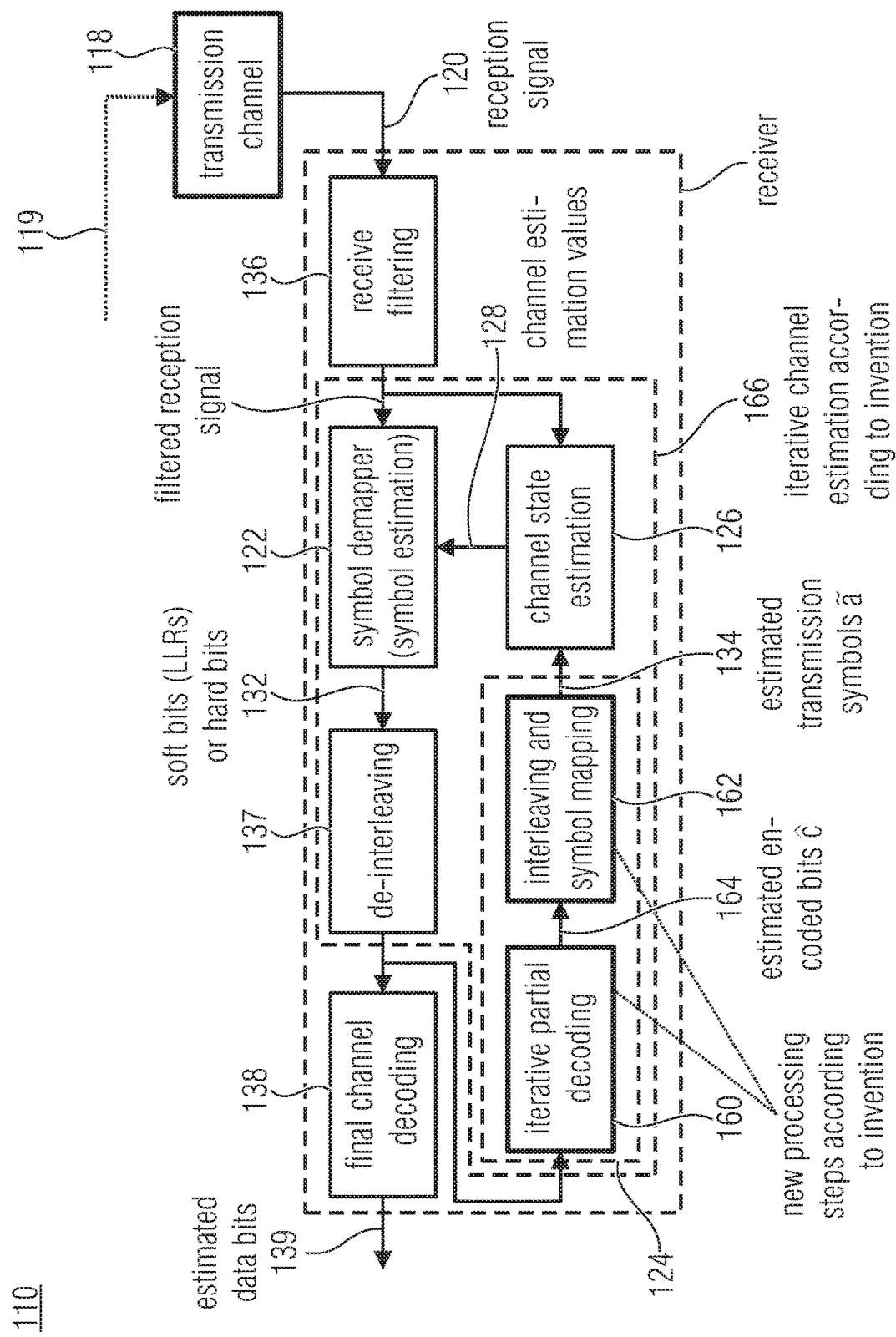
FIG. 5 shows a schematic block diagram of the data receiver with an iterative channel estimation, according to an embodiment of the present invention

FIG. 5 describes a detailed embodiment of the data receiver 100 in greater detail below.

FIG. 5 shows a schematic block diagram of the data receiver with iterative channel estimation, according to an embodiment of the present invention. In other words, FIG. 5 shows an example of the structure of the receiver of the transmission system modified according to an embodiment.

As can be seen in FIG. 5, the data receiver 110 can be configured to receive a signal (reception signal) 120, wherein the reception signal 120 can be a version of a transmit signal 119 of a data transmitter modified by the transmission channel 118. The data receiver 110 can include the symbol demapper 122 configured to perform symbol estimation based on the reception signal 120 and using the channel state information (channel estimates) 128 to provide a set of received encoded bits 132. Further, the data receiver 110 can include the transmit symbol estimator 124 which can be configured to determine a set of estimated encoded bits (=bits most likely to correspond to the transmitter-side encoded bits) based on the set of received encoded bits 132, and to map the set of estimated encoded bits to transmit symbols to obtain a set of estimated transmit symbols 134. Further, the data receiver 110 can include the channel state estimator 126 which can be configured to update the channel state information (channel estimates) 128 using the set of estimated transmit symbols 134.

As can be seen in FIG. 5, in embodiments, the data receiver 110 can comprise a receive filter 136, a deinterleaver 137 and a channel decoder 138. The channel decoder 138 can be configured to perform final channel decoding to provide estimated data bits 139.

Optionally, the symbol demapper 122 can comprise an equalizer, which can be configured to equalize the filtered reception signal.

In embodiments, the transmit symbol estimator 124 can comprise an iterative partial decoder 160 and an interleaver and symbol mapper 162. The iterative partial decoder can be configured to decode a set of received encoded bits (or a de-interleaved version thereof) to determine a set of estimated encoded bits 164 using the transmitter-side redundancy-introducing encoding. The interleaver and symbol mapper 162 can be configured to interleave the set of estimated bits 164 using a mapping rule matching a transmitter-side mapping rule and map the same to estimated transmit symbols to obtain a set of estimated transmit symbols 134.

Depending on the implementation of the transmission system, in embodiments, the order of interleaving and symbol mapping can be reversed, i.e. the interleaving can be done on a bit or symbol level. This is not relevant for the application and use of embodiments, so that only one of the two cases is considered here.

The estimates of the transmit symbols 134 (ã) obtained by the partial decoding process comprise a lower error rate for transmission over a disturbed channel than those from a state-of-the-art symbol estimator (see FIG. 1).

For a better understanding of the further explanations, the basic functional principle of symbol-assisted iterative channel estimation is briefly explained. With symbol-assisted iterative channel estimation, the channel state at a desired instant $T_k$ is typically estimated on the basis of a suitable reception signal section of the duration $T_{sig}$ as well as a sequence of the length L of temporally associated estimated transmit symbols. This is illustrated exemplarity in FIG. 6.

Figure 6:
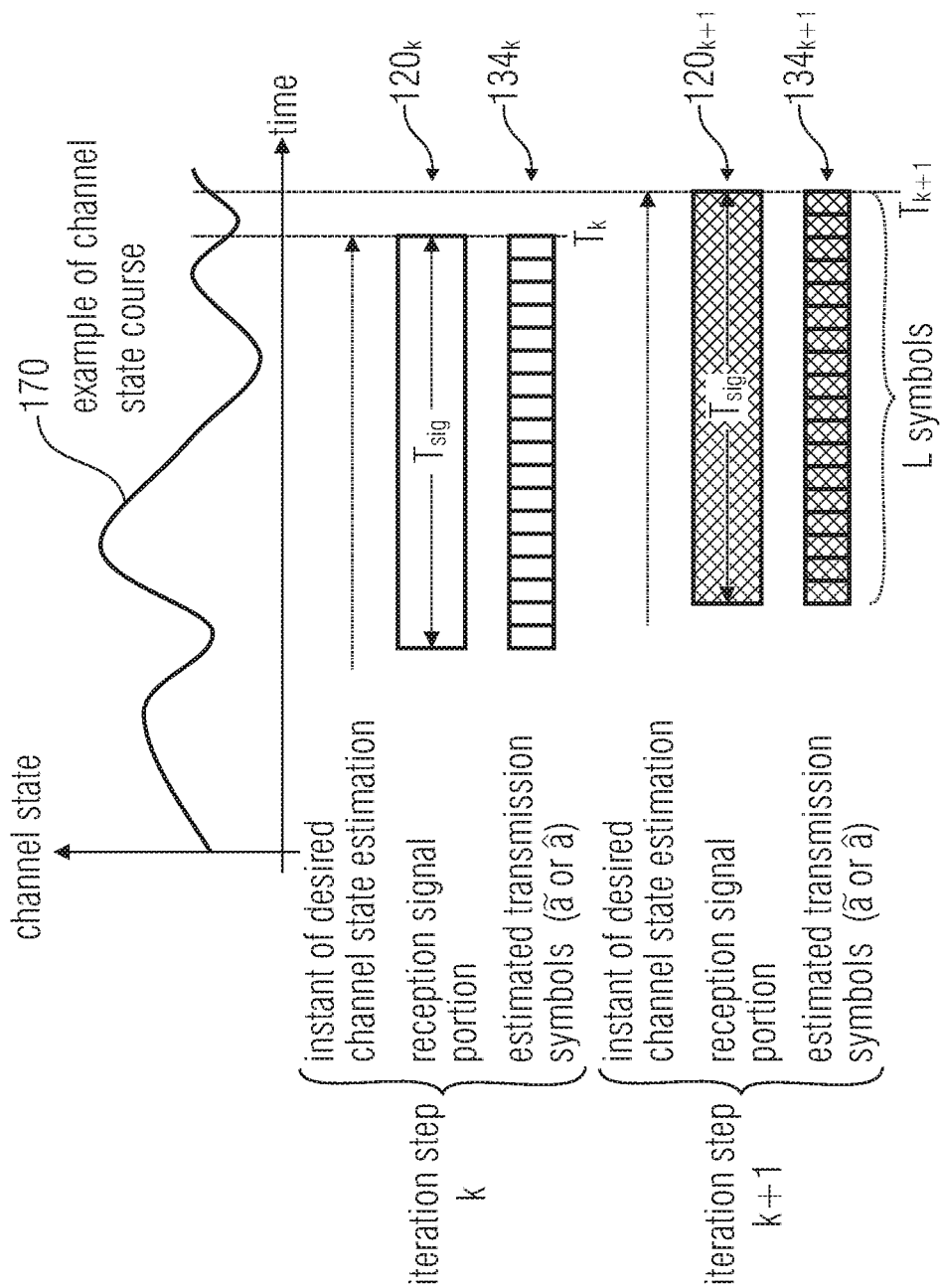
FIG. 6 shows a channel state plotted over time as well as sections of the reception signal and corresponding estimated transmission symbols for the iteration steps k and k+1, according to an embodiment, in a diagram.

In detail, FIG. 6 shows a channel state 170 plotted over time as well as sections of the reception signal 120k and 120$_{k+1}$ and corresponding estimated transmit symbols 134k and 134$k_{+1}$ for the iteration steps k and k+1 in a diagram. In other words, FIG. 6 shows a principle of iterative channel estimation and an exemplary representation of the iteration steps k and k+1.

The time $T_k$, when the channel is to be estimated in iteration step k can be located both at the edge (as shown here) and outside of the signal section used for channel state estimation. The time interval between two successive iteration steps ($T_{k+1}-T_k$) is typically an integer multiple of the symbol duration $T_s$.

The parameters of the iterative channel estimation, e.g. ($T_{k+1}-T_k$)/$T_s$, $T_{sig}$, L, as well as the exact method can be determined by the parameters and the respective operating point of the transmission system, e.g. the amount and type of disturbance by noise and interference ($E_s/N_0$, signal-to-disturbance power ratio CIR) as well as the speed of the changing channel (for mobile radio channels e.g. Doppler spread).

For the best possible function of symbol-assisted iterative channel estimation, especially for highly time-variant channels, the following should be aimed at:

(1) the estimated transmit symbols used for channel estimation are available as a gapless, i.e. temporally successive sequence,
(2) the last estimated transmit symbol is as close in time as possible to the desired instant of the channel estimation (low latency) and
(3) the estimated transmit symbols have the highest possible reliability or low error rate.

Points (1) and (2) result in certain requirements to the structure of channel encoding (e.g. FEC), which in decoder-assisted channel estimation (e.g. always) has to be considered together with the subsequent interleaver. Thus, the decoder 160 can provide estimates of all the L(=(1/B)-(R-N)) transmission symbols 146 used for the channel estimation in the iteration step (k+1) to complete the k-th iteration step.

Figure 7:
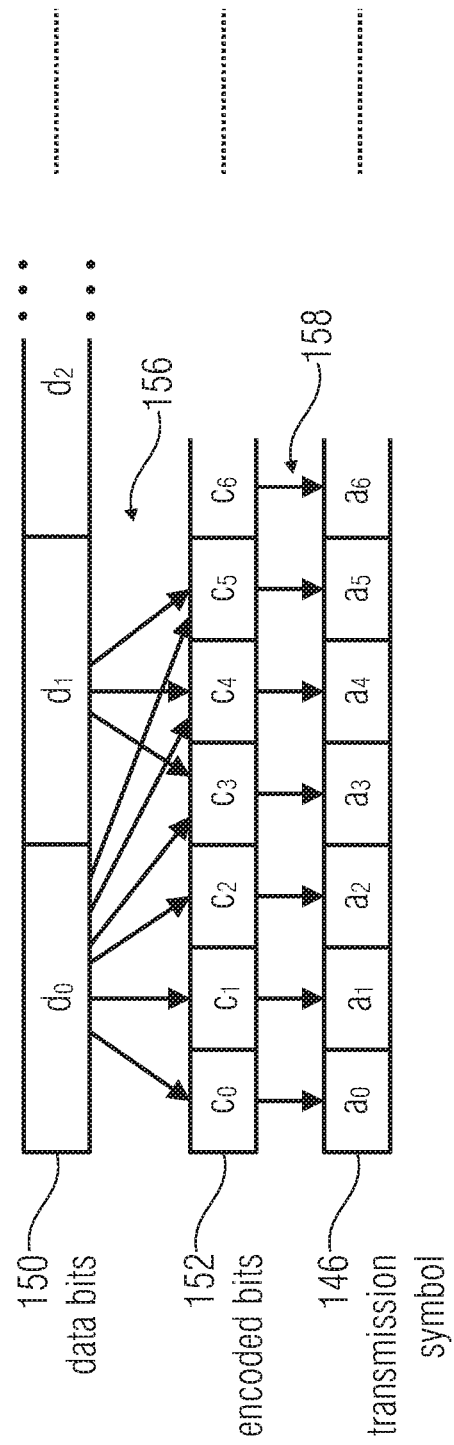
FIG. 7 shows a schematic view of the coding of a data bit sequence to form encoded bits using convolutional encoding with a code rate 1/(R=3) and mapping of the encoded bits onto transmission symbols, according to an embodiment.

First, a simple example is used to illustrate this, in which conventional convolutional encoding with a code rate 1/(R=3) and binary symbol mapping (BPSK symbol mapping) is assumed for channel encoding (e.g. FEC), as illustrated exemplarily in FIG. 7. The interleaver is omitted in this example.

In detail, FIG. 7 shows a schematic view of the encoding of a data bit sequence 150 ($d_0, d_1, d_2, \ldots, d_{N-1}$) to form a sequence of encoded bits 152 ($c_0, c_1, c_2, c_3, \ldots c_{R-N-1}$) using convolutional encoding with a code rate 1/(R=3) and mapping the sequence of encoded bits 152 ($c_0, c_1, c_2, c_3, \ldots c_{R-N-1}$) to transmit symbols 146 ($a_0, a_1, a_2, a_3, \ldots a_{R-N-1}$). In other words, FIG. 7 shows data bits and transmit symbols with 1/(R=3)-rate convolutional encoding and BPSK mapping, where the connecting lines 156 and 158 in FIG. 7 symbolize dependencies.

FIG. 7 illustrates that the contents of the transmit symbols $a_0, a_1, a_2$ (146) depends only on the (usually known) initial state of the convolutional encoder and the first data bit $d_0$ (150) to be encoded. The contents of the transmit symbols $a_3, a_4, a_5$ (146) depends on the first two data bits $d_0, d_1$ (150), the contents of the transmit symbols $a_6, a_7, a_8$ (146) depends on the first three data bits $d_0, d_1, d_2$ (150), etc. This means that in the selected example the Viterbi decoder typically used for decoding a convolutional code can (at the earliest) make a decision on the first N data bits after the respective first 3*N received symbols. Nevertheless, the reliability of the partial decoding can be improved by processing more than 3*N received symbols to decide on the first N data bits. This aspect will be discussed later.

To decide on the first N data bits $d_0 \ldots d_{N-1}$, the decoder needs so-called soft bits (e.g. LLRs) or hard bits from the symbol demapper 122 at the input, which can be derived directly from estimates $â_0 \ldots â_{3N-1}$ (134) for the transmit symbols in the assumed BPSK mapping (see FIG. 5). In the course of partial decoding, the decoder 160 can make a new decision on the most likely transmitted partial data bit sequence in each iteration step. Due to the redundancy introduced by channel encoding (e.g. FEC), a different symbol sequence $ã_0 \ldots ã_{3N-1}$ (set of estimated symbols 134) may prove to be more probable after the partial decoding process with subsequent interleaving and symbol mapping than the sequence $â_0 \ldots â_{3N-1}$ (set of received symbols) estimated by the symbol demapper 122. Due to the decoding gain, the sequence a (134) derived from the partial decoding is more reliable than the sequence â estimated by the symbol demapper 122 and is therefore used as input quantity for the channel state estimator 126.

Requirements to the combination of channel encoding (e.g. FEC) and interleaving are described below.

As already described above, for an optimal function of the iterative channel estimation, the estimated transmission symbols used for this purpose are to be available in a sequence with as little gaps as possible, i.e., directly consecutive in time. For the combination of channel encoding (e.g. FEC) and interleaving, this results in the requirement that a partial decoding process is possible with coding gain when soft or hard bits from the symbol demapper 122 are fed, which are based on consecutive symbols.

In the following, some specific embodiments of implementing channel encoding (e.g. FEC) and interleaving are shown for illustration purposes (without limiting the general validity). For better understanding, convolutional encoding with rate 1/(R=3) and a BPSK symbol mapping are assumed, like before.

The following notation is assumed. According to FIG. 1, the bits encoded by channel encoding (FEC) are designated cn, n=0 ... N−1, $c_n \in \{0,1\}$, the bits after interleaving are designated bn, n=0 ... N−1, $b_n \in \{0,1\}$. Due to the BPSK symbol mapping, the following applies for the transmission symbols: $a_n = (2*b_n - 1)$, n=0 ... N−1, $a_n \in \{-1, +1\}$. The assignment of the interleaver is graphically illustrated in the following FIGS. 8 to 13 by specifying the corresponding encoded bit $c_n$ for the respective symbol position (transmit symbol index), on the basis of which the transmit symbol is generated.

Figure 8:
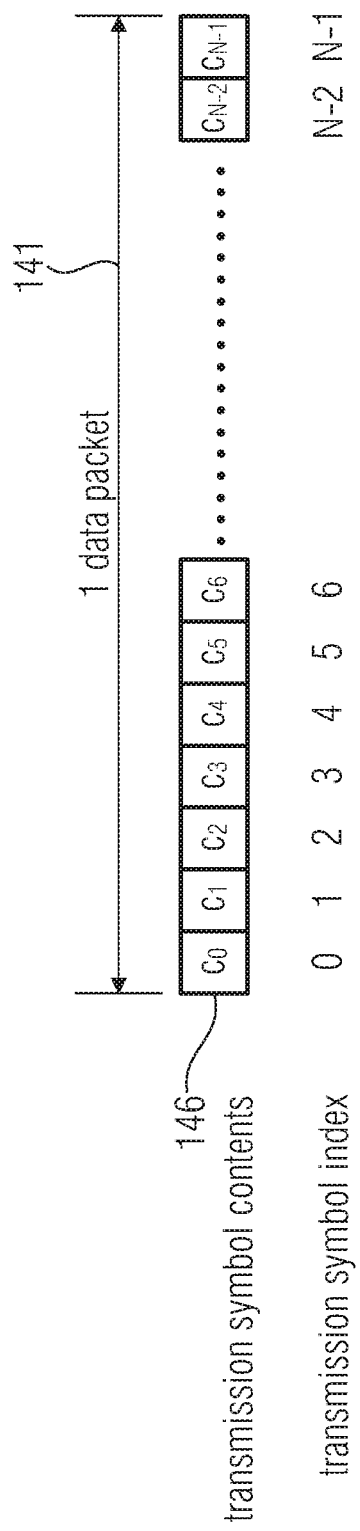
FIG. 8 shows a schematic view of a data packet with N data symbols.

According to a first example, a message can be transmitted in a data packet without interleaving, as shown in FIG. 8.

In detail, FIG. 8 shows a schematic view of a data packet 141 with N data symbols 146 ($c_0, c_1, c_2, \ldots, c_{N-1}$). In other words, FIG. 8 shows an embodiment without interleaving, where the message may consist of one data packet.

As can be seen in FIG. 8, the interleaver is omitted here after channel coding (e.g. FEC), which can be seen from the linearly increasing indexing of the encoded bits c. The decoding process can be carried out analogously to the example shown in FIG. 7.

According to a second example, a message can be transmitted divided into several partial data packets with block interleaving.

Figure 9:
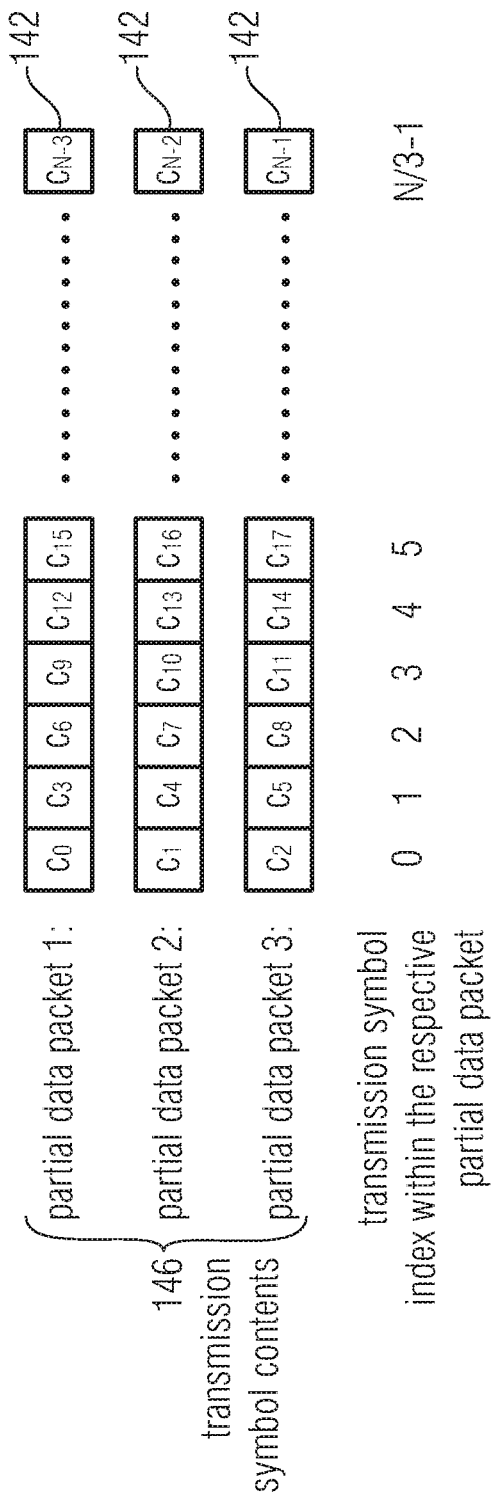
FIG. 9 shows a schematic view of three partial data packets, where the N data symbols are divided interleaved among the three partial data packets, according to an embodiment.

FIG. 9 shows a schematic view of three partial data packets 142, where the N data symbols 146 ($c_0, c_1, c_2, \ldots, c_{N-1}$) are divided interleaved among the three partial data packets 142. In other words, FIG. 9 shows an embodiment with interleaving, where the message may consist of three partial data packets 142.

In FIG. 9, it can be seen that the block interleaver—starting with the first encoded bit—associates every third bit of the sequence of encoded bits $c_0, c_1, c_2, \ldots, c_{N-1}$ to the first partial data packet 142. A corresponding association is made for the second and third partial data packet 142, starting with the second and third encoded bit, respectively.

If the three partial data packets 142 are each subject to a different time-variant transmission channel during transmission, an individual, iterative channel estimate can be made in receiver 110 for each partial data packet 142. In the first partial data packet, for example, an iterative channel estimator successively entails the estimation of the transmit symbols 146, which are based on the symbols belonging to the encoded bits $c_{3 \cdot n}$, n=0, 1, . . . (N/3−1). In a partial decoding process—in which in this example a Viterbi decoder is advantageously used as sequence estimator—the transmit symbols which are based on the encoded bits $c_{3*n+1}$, and $c_{3*n+2}$ are also included. Thus, the symbols of the second and third partial data packet 142 are also included in the estimation of the transmit symbols from the first partial data packet 142, which results in a more reliable estimation of the transmit symbols for all three partial data packets 142, which in turn makes the iterative channel estimation more reliable.

According to a third example, a message can be transmitted divided into a plurality of partial data packets 142 with preambles.

Figure 10:
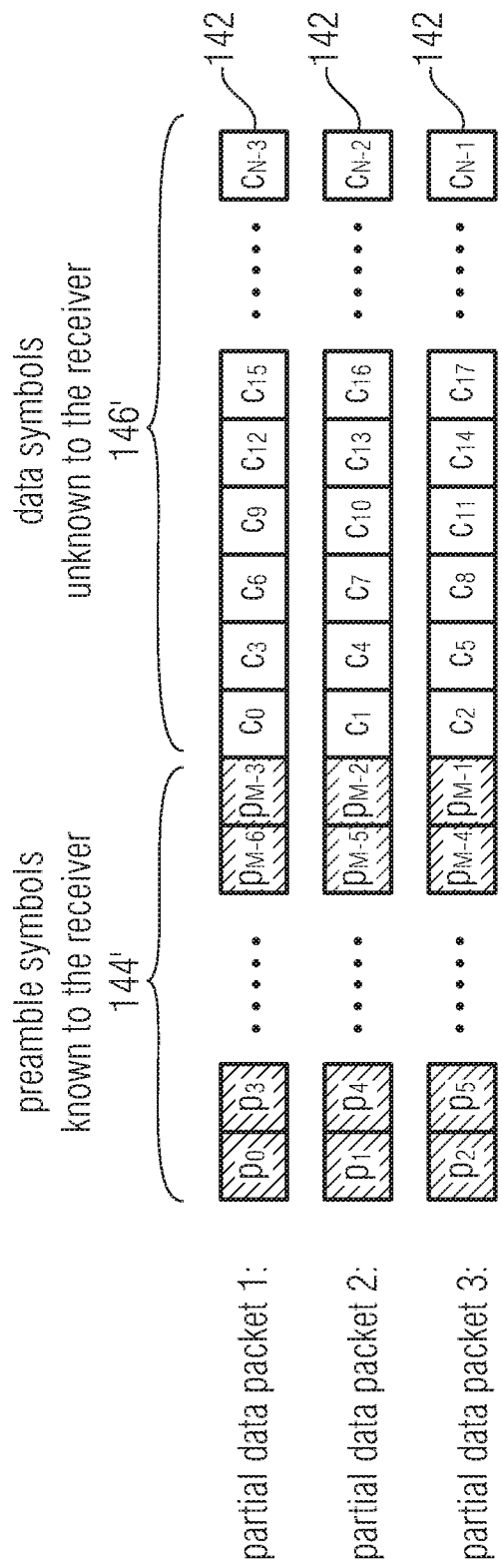
FIG. 10 shows a schematic view of three partial data packets, where the N data symbols are divided interleaved among the three partial data packets, where the three partial data packets further comprise M preamble symbols which are also divided interleaved among the three partial data packets and precede the data symbols in the respective partial data packets, according to an embodiment.

FIG. 10 shows a schematic view of three partial data packets 142, where the N data symbols 146 ($c_0, c_1, c_2, \ldots, c_{N-1}$) are divided interleaved among the three partial data packets 142, the partial data packets 142 further comprising M preamble symbols 144 ($p_0, p_1, p_3, \ldots p_{M-1}$), which are also divided interleaved among the three partial data packets 142 and are placed upstream of the data symbols 146 in the respective partial data packets 142. In other words, FIG. 10 shows an embodiment with preamble, where the message consists of three partial data packets 142.

In this embodiment, in each partial data packet 142, the data-dependent transmission symbols 146 unknown to the receiver 110 can be preceded by a preamble (also reference or training or pilot sequence) 144 of length M/3, the symbols of which are known to the receiver in advance. It is irrelevant for the application of the embodiments whether the partial data packets 142 use identical or different preamble sequences 144.

In this embodiment, an initial channel state estimation can be performed at first for each partial data packet 142 based on the preamble symbols 144 known to the receiver 110. In the transition region between the preamble symbols 144 and the unknown data symbols 146, the channel state estimation can be performed based on a sequence consisting of both preamble symbols 144 and (using the iterative partial decoding) estimated data symbols 146.

According to a fourth example, a message can be transmitted divided into a number of partial data packets 142 with midambles and interleaving.

Figure 11:
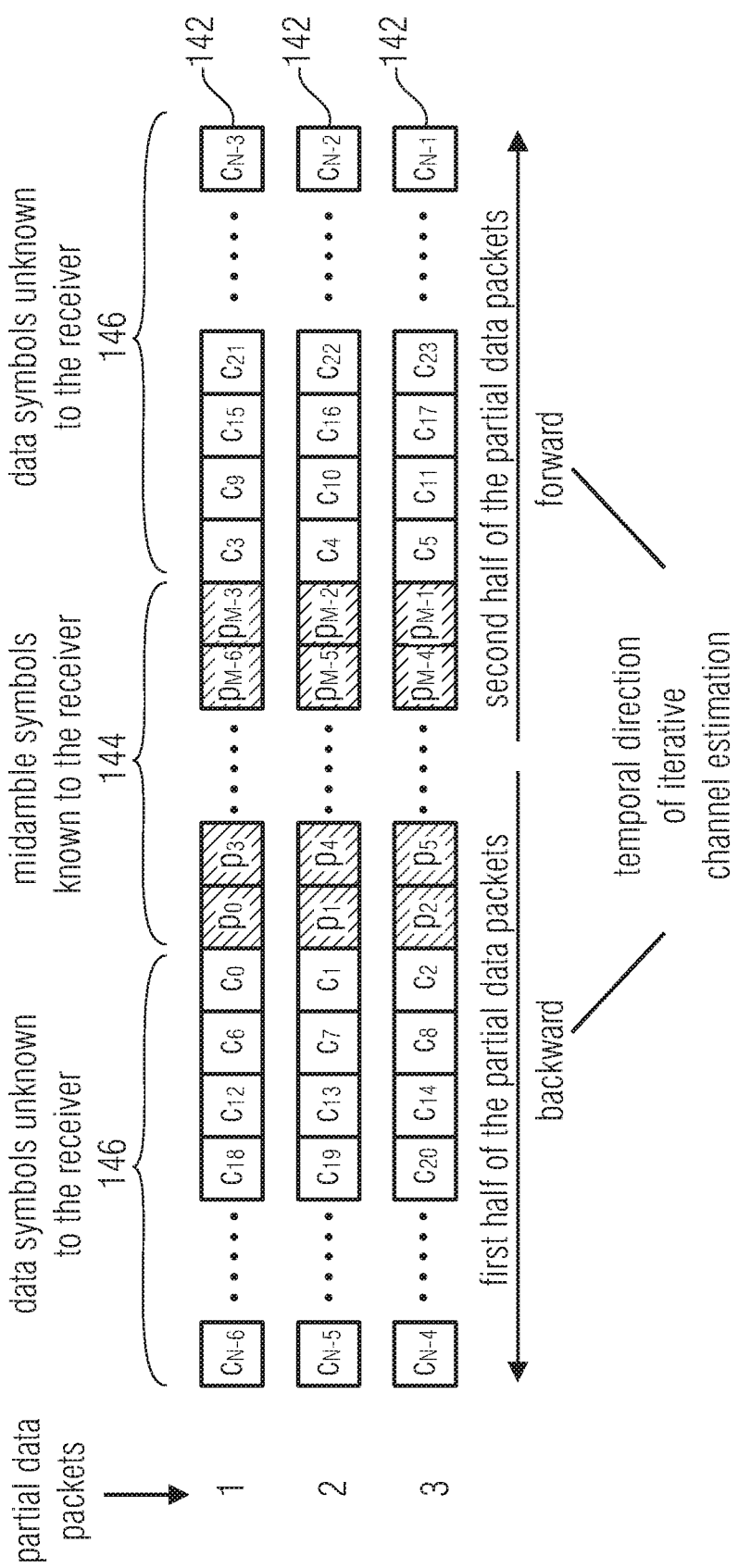
FIG. 11 shows a schematic view of three partial data packets, where the N data symbols are divided interleaved among the three partial data packets, where the three partial data packets further comprise M preamble symbols (midamble symbols) which are also divided interleaved among the three partial data packets and are arranged in the respective partial data packets in the center between the data symbols, according to an embodiment.

FIG. 11 shows a schematic view of three partial data packets 142, the N data symbols 146 ($c_0, c_1, c_2, \ldots, c_{N-1}$) being divided interleaved among the three partial data packets 142, the three partial data packets 142 further comprising M preamble symbols 144 ($p_0, p_1, p_2, p_3, \ldots, p_{M-1}$) which are also divided interleaved among the three partial data packets 142 and are located in the center between the data symbols 146 in the respective partial data packets 142. In other words, FIG. 11 shows an embodiment with midamble, where the message consists of three partial data packets 142.

As can be seen in FIG. 11, the symbols to be transferred (data symbols 146) can be arranged "column by column" by the interleaver, successively from inside to outside around the midamble. An exact symmetry in the structure of the partial data packets 142, i.e. an equal number of data symbols 146 before and after the midamble, is not necessary, but helpful.

With such a structure of partial data packets 142, the iterative channel estimation of the first half of the partial data packets 142 can be performed advantageously in reverse time direction ("backward"), in the second half in normal time direction ("forward"). For the execution of the channel estimation in backward direction, for example, a temporally inverse arrangement of signal sections and symbol sequences as well as a conjugation of certain quantities can be performed.

Note that due to the interleaver-defined symbol arrangement, the partial decoding process itself will always be in regular (positive) time direction, even if the iterative channel estimation for the first halves of the partial data packets 142 is in inverse time direction.

An interleaver for the transmission of telegrams with a variable number of partial data packets (sub-packet number), operating in correspondence with the above embodiment, is described in [5].

According to a fifth example, a message can be transmitted with cyclically shifted bits after channel encoding.

This embodiment refers specifically to the transmission of a message in partial data packets according to the ETSI standard [6]. A message with a length of 186 bits with a ⅓-rate convolutional code with constraint length 7 with a final "zero termination" is encoded, resulting in a sequence of 576 encoded bits ($c_0 \ldots c_{575}$).

In a first step, the interleaver can perform a cyclic shift of 48 bits in a first step, as described in [5], [6]. This is shown in FIG. 12.

Figure 12:
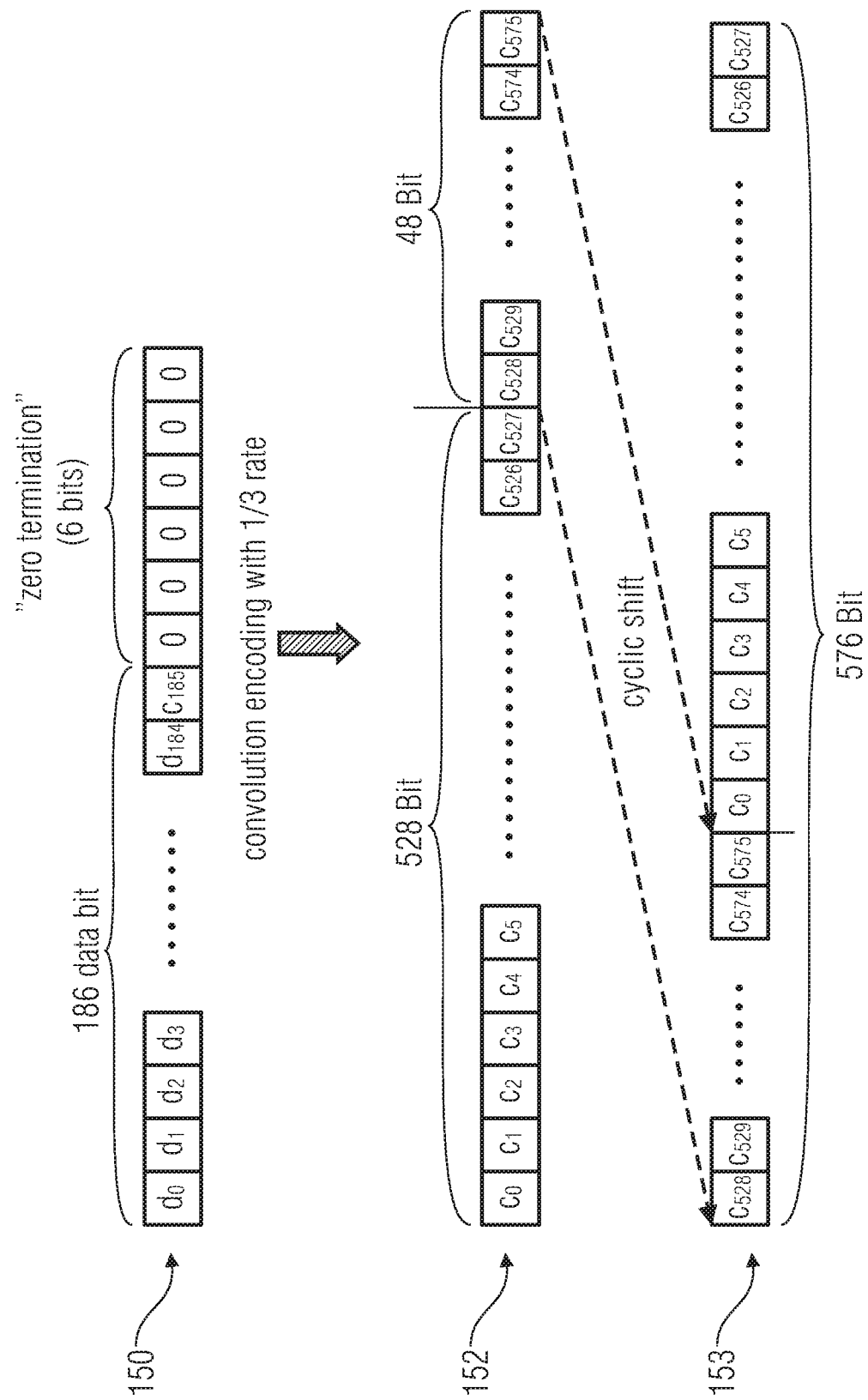
FIG. 12 shows a schematic view of the encoding of an exemplary data bit sequence of 186 bits, padded with zeros to a data bit sequence of 192 bits, to a sequence of 576 encoded bits using convolutional encoding with a code rate 1/(R=3) and cyclically shifting the last 48 bits of the sequence of 576 encoded bits to the beginning of the sequence of 576 encoded bits to obtain a cyclically shifted sequence of 576 encoded bits, according to an embodiment.

FIG. 12 shows a schematic view of encoding an exemplary data bit sequence ($d_0, d_1, d_2, \ldots, d_{185}$) with 186 bits, which is filled up with zeros to form a data bit sequence with 192 bits, to a sequence of 576 encoded bits 152 ($c_0, c_1, c_2, c_3, \ldots c_{575}$) using convolutional coding with a code rate 1/(R=3) and cyclically shifting the last 48 bits of the sequence of 576 encoded bits 152 to the beginning of the sequence of 576 encoded bits 152 to obtain a cyclically shifted sequence of 576 encoded bits 153 ($c_{528}$, $c_{529}$, $c_{530}$, ..., $c_{575}$, $c_0$, $c_1$, $c_2$, $c_3$, ... $c_{527}$). In other words, FIG. 12 shows a cyclic shift of the last 48 bits of the encoded bit sequence 152 in the first step.

Subsequently, the cyclically shifted bit sequence 153 is divided into 24 partial data packets 142. Each partial data packet 142 contains 36 symbols, structured as follows: twelve data symbols 146, twelve midamble symbols 144, twelve data symbols 146. Similarly to FIG. 11, the association of the (cyclically shifted) encoded bit sequence 153 is performed "column by column" from the inside to the outside with respect to the midamble.

Figure 13:
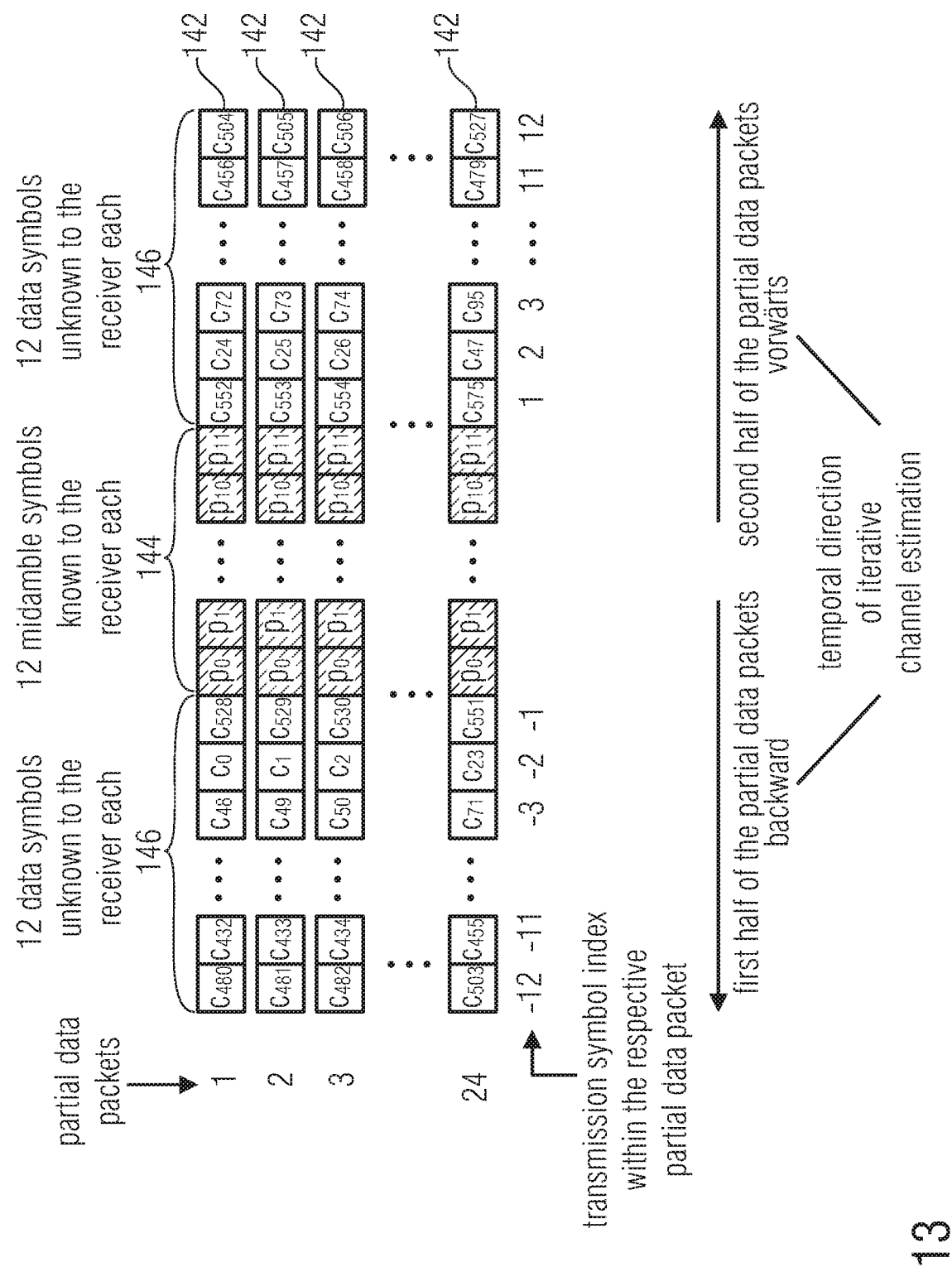
FIG. 13 shows a schematic view of 24 partial data packets, where the 576 encoded bits of the cyclically shifted data bit sequence ($c_{528}$, $c_{529}$, $c_{530}$, . . . , $c_{575}$, $c_0$, $c_1$, $c_2$, $c_3$, . . . $c_{527}$) 153 are divided interleaved among the 24 partial data packets 142, wherein the 24 partial data packets 142 further each comprise 12 preamble symbols (midamble symbols) 144 ($p_0$, $p_1$, $p_2$, $p_3$, . . . , $p_{11}$) and are arranged in the respective partial data packets 142 in the center between the data symbols 146, according to an embodiment.

The structure of the entire interleaver (considering the cyclic shift) is illustrated in FIG. 13.

FIG. 13 shows a schematic view of 24 partial data packets 142, where the 576 bits of the cyclically shifted data bit sequence ($c_{528}$, $c_{529}$, $c_{530}$, ..., $c_{575}$, $c_0$, $c_1$, $c_2$, $c_3$, ... $c_{527}$) 153 are divided interleaved among the 24 partial data packets 142, wherein the 24 partial data packets 142 further each comprise 12 preamble symbols 144 ($p_0$, $p_1$, $p_2$, $p_3$, ..., $p_{11}$) and are arranged in the respective partial data packets 142 in the middle between the data symbols 146. In other words, FIG. 13 shows an embodiment of the interleaver according to ETSI standard [6], where the message consists of 24 partial data packets 142 with 36 symbols each.

For the sake of clarity, the symbol indices of the transmission symbols 146 (assigned to the encoded bits) are numbered from −12 ... −1 for the symbols located before the midamble and from +1 ... +12 for the symbols 146 located after the midamble.

In principle, the course of the iterative channel estimation is as described in the fourth example, i.e. the iterative channel estimation of the first twelve symbols of the partial data packets 142 is performed in temporally inverse direction ("backward"), in the second half in normal temporal direction ("forward").

However, a special feature compared to the explanations above in this example is the cyclic shift by 48 bits according to FIG. 12. It is now assumed (without limiting the generality) that the Viterbi decoder provides estimated values for 48 encoded bits (corresponding to 2*24 transmit symbols) for a single iteration step.

In the first iteration step, the decoder 160 can thus provide estimates for the 24 symbols of the transmit symbol index "−1" and for another 24 symbols of the transmit symbol index "+1". This corresponds to an estimation of the encoded bits {$c_{528}$, $c_{529}$, ... $c_{575}$} according to the interleaving structure shown in FIG. 13. These represent the last 48 bits of the encoded bit sequence and are determined exclusively by the contents of the data bits {$d_{180}$, $d_{181}$, ... $d_{185}$}. Due to the "zero termination" of the convolutional encoder, partial decoding of the transmitted data bits {$d_{180}$, $d_{181}$, ... $d_{185}$} is possible (if the estimated receive symbols are present for the transmit symbol indices "−1" and "+1") if the initial state is unknown and the final state is known in the trellis diagram of the Viterbi decoder. Since ultimately an improved estimation of the encoded bits {$c_{528}$, $c_{529}$, ... $c_{575}$} is aimed at, an explicit determination of the transmitted data bits {$d_{180}$, $d_{181}$, ... $d_{185}$} can be avoided by determining the most probable path in the trellis diagram in the course of the partial decoding in the Viterbi decoder and using the encoded bits associated with this path as estimates for the encoded bits {$c_{528}$, $c_{529}$, ... $c_{575}$}. This procedure is also possible in all further iteration steps and is not explicitly mentioned in the following.

In the second iteration step, concerning the transmit symbol indices "−2" and "+2", the Viterbi decoder estimates the encoded bits {$c_0$, $c_1$, ... $c_{47}$}, which result from the data bits {$d_0$, $d_1$, ... $d_{15}$}.

In this case, the Viterbi decoder runs during partial decoding with known initial state ("0") and unknown final state. In order to reduce the loss of reliability of the sequence estimation caused by the unknown final state, it is recommended to include the 48 symbols estimated by the symbol demapper 122 at the time instants "−3" and "+3", even if they are a bit further away from the time instants of the last channel state estimation.

The described procedure is performed for all further iteration steps. Starting with the third step (k=3), the probability information of the initial states of the Viterbi decoder can be preset with the respective temporally associated probability information of the previous decoder call.

In some of the above embodiments (FIG. 9, FIG. 10 and FIG. 11), for reasons of clarity, the principle of the invention—in particular an association of the encoded bits to the transmission symbol positions given by the interleaver, which is advantageous in the sense of the invention—was presented for three partial data packets, a convolutional encoding with a code rate of ⅓ and binary (BPSK) symbol mapping.

An application of the shown principle to a different number of partial data packets or to a different code rate than the one chosen in the example of ⅓ is easily comprehensible for the person skilled in the art. This is also true for the application of a higher-level symbol mapping, whereby a transmit symbol is constituted by more than one encoded bit. Another type of encoding than convolutional encoding can also be considered as FEC if, in combination with the selected interleaver, it can be used during partial decoding to achieve a corresponding coding gain.

FIG. 14 shows a flowchart of a method 200 for receiving a signal, the signal comprising at least two separate partial data packets, the at least two separate partial data packets comprising symbols which map encoded bits resulting from redundancy-introducing encoding of a data bit sequence performed jointly for the at least two separate partial data packets. The method 200 comprises a step 202 of estimating a channel state of a transmission channel of the signal based on the received signal to obtain first channel state information. Further, the method 200 comprises a step 204 of demodulating a first set of received symbols from different partial data packets using the first channel state information, wherein the first set of received symbols is a real subset of the received symbols of the at least two partial data packets, to obtain a first set of received encoded bits, wherein the first set of received encoded bits makes it possible to draw conclusions as to a first set of encoded bits corresponding on the transmitter side to the first set of received encoded bits by utilizing the transmitter-side redundancy-introducing encoding. The method 200 further comprises a step 206 of decoding the first set of received encoded bits to determine a first set of estimated encoded bits using the transmitter-side redundancy-introducing encoding. The method 200 further comprises a step 208 of mapping the first set of estimated bits to estimated transmit symbols using a mapping rule matching a transmitter-side mapping rule to obtain a first set of estimated transmit symbols. The method 200 further comprises a step 210 of determining second channel state information using the first set of estimated transmit symbols.

Embodiments provide an iterative decoder-assisted channel estimation. The following takes place here:
- an iterative channel estimation with (successive) partial decoding,
- an exploitation of the coding gain for more reliable estimation of transmission symbols, and
- a provision of symbols for the channel state estimation by the decoder as well as subsequent interleaving and symbol mapping.

Embodiments are in principle applicable to any kind of FEC encoding applied on the transmitter side, which
(1) enables partial decoding of the transmission sequence with coding gain and
(2) in the context of partial decoding, can provide estimates for the encoded bits and thus for the transmitted symbols, and
(3) in combination with the interleaver and the symbol mapping, the transmit symbols estimated in the iterative method succeed one another in such a way that they are useful for a successively (in positive or negative time direction) progressing channel estimation.

Embodiments provide partial decoding using a Viterbi decoder. If convolutional encoding is used as channel encoding (e.g. FEC) on the transmitter side, a Viterbi decoder can be used for the partial decoding, which can decode a convolutional code optimally under certain circumstances.

In the following, input variables for partial decoding with a Viterbi decoder are described. The Viterbi decoder uses hard bits (binary) or reliability information in the form of soft bits (e.g. LLRs), which are provided by the symbol demapper, as input variables for partial decoding. Further input variables can be the probabilities (depending on the implementation e.g. in linear or logarithmic form) for each state in the associated trellis diagram at the beginning and at the end (e.g. actually for the current call an output variable, which only functions as input variable in the next call) of the partial decoding.

The following describes state probabilities for the beginning and the end of partial decoding. The probability information about all the possible initial states of partial decoding consist of internal state probabilities of the respective preceding call of the Viterbi decoder in case of successive calls of the Viterbi decoder and a seamlessly continuous data bit sequence or are derived directly from them. If initial and/or final state for a partial decoding are known a-priori, they will be considered accordingly when calling the Viterbi decoder.

In the following, partial decoding with decoder lag is described. For an optimal sequence estimation, the Viterbi decoder ideally needs a known final state. This condition is usually not met during partial decoding. For this reason, the partial decoding can be extended beyond the length of the actually desired sequence (decoder lag) to increase the reliability of the sequence estimation. In expert literature, it is recommended to extend the decoding process by about five times the constraint length of the convolutional code beyond the sequence to be estimated. This lag is reduced successively if, as the end of the sequence of encoded data bits is approached, the usually known final state can be used in the decoding process.

Embodiments provide an iterative channel estimation when transmitting a message in several partial data packets. The prerequisite for this is that a message (data packet) encoded by FEC is transmitted divided into several partial data packets (see e.g. FIG. 9, FIG. 10 and FIG. 11).

Each partial data packet can potentially be subject to an individual, time-variant transmission channel during its transmission. This may entail an individual channel state estimation for each partial data packet. In the receiver, an individual channel state estimation can be performed for each partial data packet, but the estimated transmit symbols used for this purpose are based on a partial decoding process common to all partial data packets concerned. This can be referred to as a joint cross-partial data packet channel estimation which estimates the channel state of several transmission channels simultaneously (multidimensional iterative channel estimation).

Embodiments provide a diversity of reception. If there are diversity of reception and thus several reception signals in the receiver, e.g. by using several antennas, the method can be applied in the following way: the symbol demapper can perform a so-called "Maximum Ratio Combining" (MRC) for the reception symbols obtained from all the reception signals. The channel state estimation can be done individually for each reception signal.

Embodiments provide a use of the results from the partial decoding for data bit estimation. The partial decoding in the context of the iterative channel estimation serves primarily the purpose of providing the channel state estimation with transmit symbols estimated as reliably as possible. Nevertheless, in the iterative partial decoding, estimates for the transmitted data bits can be obtained successively. If estimates for all transmitted data bits are available after performing all the iteration steps of the channel estimation by partial decoding, a check value (e.g. cyclic redundancy check, CRC) can be used to determine whether the estimated data bits are correct. In case of a positive check result, the processing step "final channel decoding" (see FIG. 5, 138) can be omitted, thus saving the corresponding effort in the receiver.

Embodiments provide an execution of several channel estimations with different parameters. In real transmission systems, the speed of the channel change frequently is not known in advance. In radio systems, for example, the speed of the channel change correlates directly with the mostly unknown speed of movement of the radio participants, which leads to a so-called Doppler spread of the channel. For a fast channel change (e.g. by fast moving radio participants), the channel state estimator needs a different parameterization (e.g. length of the evaluated signal section) than for slow channel change.

This problem can be solved by executing several iterative channel estimations with different parameterization of the channel state estimation completely (i.e. over all the iteration steps). Thus, for example, one channel state estimation optimized for low speed of channel change is performed and additionally another channel state estimation optimized for high speed of channel change. In the representation according to FIG. 5, this means that all the blocks in the range 166 as well as the "final channel decoding" 138 are executed several times with different parameterization.

The versions for different parameterizations are advantageously carried out one after the other. After each completed execution of the iterative channel estimation for parameterization, it can be determined e.g. by means of a check value whether the estimated data bits are correct (see explanations to the embodiment of using the results from the partial decoding for data bit estimation). If the estimated data bits are correct according to the check value, the execution of further iterative channel estimations of the same reception signal with different parameterization can be omitted.

Embodiments provide a channel estimation in inverse time direction. In many transmission systems, data symbols (reference symbols) known in advance are transmitted for the detection of a signal or for the (initial) channel estimation in the receiver. If these reference symbols are preceded by unknown data symbols, the channel estimation for this part of the signal can advantageously be performed in inverse time direction ("backward"). In this case, the decoder can still process the data bit sequence to be estimated in positive time direction during iterative partial decoding. This entails a suitable interleaver.

If unknown data symbols are transmitted both before and after a sequence of known symbols (e.g. a midamble), the channel estimation can be performed in reverse direction for the part of the data symbols located temporally before the reference symbols and simultaneously in forward direction for the part of the data symbols after the reference symbols (see FIG. 11). This also entails a suitable interleaver.

Embodiments provide for a generation of symbols with reliability information. If reliability information of the estimated encoded bits č are available in partial decoding (see FIG. 5), e.g. if decoding with provision of reliability information regarding the encoded bits (soft output decoding) is used, then (after interleaving) the symbol mapper can generate from this soft symbols instead of hard symbols, which are used as input variables for the channel state estimation. In this way, the channel state estimation can be improved compared to the "hard decided" symbols case.

Embodiments are used in a system for transmitting data from a transmitter to a receiver. The concepts described herein apply to any transmission in which
  there is a potentially time-variant transmission channel between transmitter and receiver
  a continuous estimation of this channel (e.g. by amplitude and phase) is needed or advantageous,
  a forward error correction (FEC) is used, which provides redundancy for the data to be transmitted during transmission, and
  a symbol-assisted channel state estimation is used.

A typical field of application is the transmission of a message in a digital radio communication system, for example, where the transmission channel can be time-variant due to movement of the transmitter and/or receiver and where a continuous estimation of the channel is used by using coherent demodulation, for example. The invention can be particularly advantageous in a system in which a message (data packet) is transmitted in several partial data packets (so-called telegram splitting, see, for example, DE102011082098).

Although some aspects have been described in the context of an apparatus, it is clear that these aspects also represent a description of the corresponding method such that a block or device of an apparatus also is to be understood to be a respective method step or a feature of a method step. Analogously, aspects described in the context of or as a method step also represent a description of a corresponding block or item or feature of a corresponding apparatus. Some or all of the method steps may be executed by (or using) a hardware apparatus, like, for example, a microprocessor, a programmable computer or an electronic circuit. In some embodiments, some or several of the most important method steps can be executed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, PROM, EPROM, EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier.

In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier, the digital storage medium or the computer-readable medium are typically objects and/or non-transitory.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer a computer program for performing one of the methods described herein to a receiver. The transmission can be performed electronically or optically. The receiver may, for example, be a computer, a mobile device, a memory device or the like. The apparatus or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods may be performed by any hardware apparatus. This can be universally applicable hardware, such as a computer processor (CPU), or hardware specific for the method, such as ASIC.

The apparatuses described herein may be implemented, for example, using a hardware apparatus, or using a computer, or using a combination of a hardware apparatus and a computer.

The apparatuses described herein, or any components of the apparatuses described herein, may be implemented at least partially in hardware and/or software (computer program).

The methods described herein may be implemented using a hardware apparatus, or using a computer, or using a combination of a hardware apparatus and a computer.

The methods described herein, or any component of the methods described herein, may be performed at least partially by hardware and/or software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF ABBREVIATIONS

BPSK Binary Phase Shift Keying
CRC Cyclic Redundancy Check
FEC Forward Error Correction
LLR Log Likelihood Ratio
LMS Least-Mean-Squares
MRC Maximum Ratio Combining
RLS Recursive Least Squares

BIBLIOGRAPHY

[1] S. N. Crozier, D. D. Falconer, S. A. Mahmoud. "Least sum of squared errors (Isse) channel estimation". IEE Proceedings-F, 138:371-378, August 1991.
[2] Karl-Dirk Kammeyer, "Nachrichtenübertragung", Teubner-Verlag, ISBN 3-519-26142-1, 3rd edition 2004.
[3] J. G. Proakis, "Digital Communications", New York, McGraw Hill, 1995.
[4] K.-H. Chang, C. N. Georghiades, "Iterative Joint Sequence and Channel Estimation for Fast Time-Varying Intersymbol Interference Channels". In Proceedings of the International Conference on Communications (ICC'95), p. 357-361, Seattle, June 1995.
[5] PCT/EP2017/076939
[6] ETSI Technical Specification TS 103 357

The invention claimed is:

1. A data receiver,
wherein the data receiver is configured to receive a signal, the signal comprising at least two separate partial data packets, wherein the at least two separate partial data packets comprise symbols which map encoded bits resulting from a redundancy-introducing encoding of a data bit sequence performed jointly for the at least two separate partial data packets,
wherein the data receiver is configured to estimate a channel state of a transmission channel of the signal based on the received signal to acquire first channel state information,
wherein the data receiver is configured to demodulate a first set of received symbols from different partial data packets using the first channel state information, wherein the first set of received symbols is a real subset of the received symbols of the at least two partial data packets to acquire a first set of received encoded bits,
wherein the first set of received encoded bits allows drawing conclusions as to a first set of encoded bits corresponding on the transmitter side to the first set of received encoded bits, using the transmitter-side redundancy-introducing encoding,
wherein the data receiver is configured to decode the first set of received encoded bits to determine, using the transmitter-side redundancy-introducing encoding, a first set of estimated encoded bits, which corresponds to a first set of transmitted encoded bits with higher probability than the received encoded bits, and to map the first set of estimated encoded bits to estimated transmission symbols using a mapping rule matching a transmitter-side mapping rule to acquire a first set of estimated transmission symbols;
wherein the data receiver is configured to determine second channel state information using the first set of estimated transmission symbols;
wherein the data receiver is configured to demodulate a second set of received symbols from different partial data packets using the second channel state information, wherein the second set of received symbols is a real subset of the received symbols of the at least two partial data packets to acquire a second set of received encoded bits;
wherein the second set of received symbols in the respective partial data packet comprises a greater temporal spacing to pilot symbols of the at least two partial data packets than the first set of received symbols.

2. The data receiver in accordance with claim 1, wherein the first set of received symbols in the respective partial data packets is arranged adjacent to pilot symbols of the at least two partial data packets.

3. The data receiver in accordance with claim 2, wherein a first part of the first set of received symbols in the respective partial data packets is temporally arranged before the pilot symbols of the at least two partial data packets, and
wherein a second part of the first set of received symbols in the respective partial data packets is temporally arranged after the pilot symbols of the at least two partial data packets.

4. The data receiver in accordance with claim 3, wherein the second set of received symbols in the respective partial data packets is arranged adjacent to the first set of received symbols.

5. The data receiver in accordance with claim 3, wherein a first part of the second set of received symbols in the respective partial data packets is temporally arranged before the first part of the first set of received symbols, and
wherein a second part of the second set of received symbols in the respective partial data packets is temporally arranged after the second part of the first set of received symbols.

6. The data receiver in accordance with claim 1, wherein the data receiver is configured to estimate the channel state of the transmission channel at first based on pilot symbols of the at least two separate partial data packets to acquire the first channel state information.

7. The data receiver in accordance with claim 1, wherein the data receiver is configured to estimate the channel state using the first set of estimated transmission symbols to acquire the second channel state information.

8. The data receiver in accordance with claim 1,
wherein the data receiver is configured to estimate the channel state of the transmission channel for each of the at least two separate partial data packets.

9. The data receiver in accordance with claim 1,
wherein the first set of received symbols is selected such that the first set of received symbols allows reconstructing the first set of received encoded bits.

10. The data receiver in accordance with claim 1,
wherein the data receiver is configured to decode the first set of received encoded bits using a Viterbi decoder.

11. The data receiver in accordance with claim 1,
wherein the data receiver is configured to select the first set of received symbols from the received symbols of the at least two separate partial data packets based on an interleaving pattern known to the data receiver, wherein the interleaving pattern matches a transmitter-side interleaving pattern based on which the encoded bits are divided on the data transmitter side interleaved among the at least two separate partial data packets.

12. The data receiver in accordance with claim 11,
wherein the interleaving pattern comprises a cyclic shift of a predetermined number of encoded bits.

13. The data receiver in accordance with claim 1,
wherein the data receiver is configured to provide a first set of estimated transmission symbols with reliability information based on the first set of received encoded bits.

14. The data receiver in accordance with claim 1,
wherein the data receiver is configured to demodulate the first set of received symbols and to estimate a reliability for the first set of encoded bits or each encoded bit of the first set of encoded bits to additionally acquire reliability information for the first set of encoded bits.

15. The data receiver in accordance with claim 14,
wherein the data receiver is configured to provide a first set of estimated transmission symbols with reliability information based on the first set of received encoded bits and based on the reliability information of the first set of received encoded bits.

16. The data receiver in accordance with claim 1,
wherein the data receiver comprises at least two antennas,
wherein the data receiver is configured to receive the signal with the at least two antennas to acquire at least two received signals,
wherein the data receiver is configured to combine and demodulate symbols of the at least two received signals.

17. The data receiver in accordance with claim 1,
wherein the at least two separate partial data packets are spaced apart from one another in time and/or frequency.

18. The data receiver in accordance with claim 1,
wherein the at least two separate partial data packets correspond to data packets of the bit transmission layer.

19. A data receiver for receiving a signal, the signal comprising at least two separate partial data packets, wherein the at least two separate partial data packets comprise 1/B·R·N symbols which map R·N encoded bits resulting from a redundancy-introducing encoding of N data bits with a code rate of 1/R, performed together for the at least two separate partial data packets, B indicating the number of encoded bits mapped per symbol,
wherein the data receiver is configured to estimate a channel state of a transmission channel of the signal based on the received signal to acquire-th channel state information,
wherein the data receiver is configured to, in each iteration step k with k=1 to K of a sequence of K iteration steps,
demodulate a k-th set of received symbols from different partial data packets using the k-th channel state information, the k-th set of received symbols being a real subset of the R·N received symbols of the at least two partial data packets, to acquire a k-th set of received encoded bits, wherein the k-th set of received encoded bits allows drawing conclusions as to a k-th set of encoded bits corresponding on the transmitter side to the k-th set of received encoded bits, using the transmitter-side redundancy-introducing encoding,
decode the k-th set of received encoded bits to determine a k-th set of estimated encoded bits using the transmitter-side redundancy-introducing encoding, and to map the k-th set of estimated bits to estimated transmission symbols using a mapping rule mapping a transmitter-side mapping rule to acquire a k-th set of estimated transmission symbols;
determine k+1-th channel state information using the k-th set of estimated transmission symbols.

20. The data receiver in accordance with claim 19,
wherein the-th set of received symbols in the respective partial data packets is arranged adjacent to the k-th set of received symbols.

21. The data receiver in accordance with claim 19,
wherein the data receiver is configured to, in each iteration step k with k=1 to K of a sequence of K iteration steps,
estimate the k+1-th channel state information additionally using the-th set of estimated transmission symbols and/or using pilot symbols of the at least two separate partial data packets.

22. The data receiver in accordance with claim 19,
wherein the data receiver is configured to estimate the channel state of the transmission channel based on pilot symbols of the at least two separate partial data packets to acquire the-th channel state information.

23. A method for receiving a signal, the signal comprising at least two separate partial data packets, wherein the at least two separate partial data packets comprise symbols which map encoded bits resulting from a redundancy-introducing encoding of a data bit sequence performed jointly for the at least two separate partial data packets, the method comprising;
estimating a channel state of a transmission channel of the signal based on the received signal to acquire first channel state information,
demodulating a first set of received symbols from different partial data packets using the first channel state information, wherein the first set of received symbols is a real subset of the received symbols of the at least two partial data packets to acquire a first set of received encoded bits, wherein the first set of received encoded bits allows drawing conclusions as to a first set of encoded bits corresponding on the transmitter side to the first set of received encoded bits, using the transmitter-side redundancy-introducing encoding,
decoding the first set of received encoded bits to determine a first set of estimated encoded bits using the transmitter-side redundancy-introducing encoding,
mapping the first set of estimated encoded bits to estimated transmission symbols using a mapping rule matching a transmitter-side mapping rule to acquire a first set of estimated transmission symbols;

determining second channel state information using the first set of estimated transmission symbols; and demodulating a second set of received symbols from different partial data packets using the second channel state information, wherein the second set of received symbols is a real subset of the received symbols of the at least two partial data packets to acquire a second set of received encoded bits;

wherein the second set of received symbols in the respective partial data packets comprises greater a temporal spacing to pilot symbols of the at least two partial data packets than the first set of received symbols.

24. A non-transitory digital storage medium having stored thereon a computer program for performing a method for receiving a signal, the signal comprising at least two separate partial data packets, wherein the at least two separate partial data packets comprise symbols which map encoded bits resulting from a redundancy-introducing encoding of a data bit sequence performed jointly for the at least two separate partial data packets, the method comprising:

estimating a channel state of a transmission channel of the signal based on the received signal to acquire first channel state information, demodulating a first set of received symbols from different partial data packets using the first channel state information, wherein the first set of received symbols is a real subset of the received symbols of the at least two partial data packets to acquire a first set of received encoded bits, wherein the first set of received encoded bits allows drawing conclusions as to a first set of encoded bits corresponding on the transmitter side to the first set of received encoded bits, using the transmitter-side redundancy-introducing encoding, decoding the first set of received encoded bits to determine a first set of estimated encoded bits using the transmitter-side redundancy-introducing encoding, mapping the first set of estimated encoded bits to estimated transmission symbols using a mapping rule matching a transmitter-side mapping rule to acquire a first set of estimated transmission symbols;

determining second channel state information using the first set of estimated transmission symbols; and demodulating a second set of received symbols from different partial data packets using the second channel state information, wherein the second set of received symbols is a real subset of the received symbols of the at least two partial data packets to acquire a second set of received encoded bits;

wherein the second set of received symbols in the respective partial data packets comprises greater a temporal spacing to pilot symbols of the at least two partial data packets than the first set of received symbols, when said computer program is run by a computer.

* * * * *